US012777545B2

(12) United States Patent
Jain et al.

(10) Patent No.: US 12,777,545 B2
(45) Date of Patent: Oct. 27, 2026

(54) UPLINK AND DOWNLINK DATA PATH ENHANCEMENTS FOR CU-UP CHANGE

(71) Applicant: Dell Products L.P., Round Rock, TX (US)

(72) Inventors: Hemant Kumar Bhawarlal Jain, Bangalore (IN); Prashanth Murthy, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 416 days.

(21) Appl. No.: 18/488,788

(22) Filed: Oct. 17, 2023

(65) Prior Publication Data

US 2025/0126669 A1 Apr. 17, 2025

(51) Int. Cl.
*H04W 76/20* (2018.01)

(52) U.S. Cl.
CPC .................................. *H04W 76/20* (2018.02)

(58) Field of Classification Search
CPC ..... H04W 76/20; H04W 76/12; H04W 76/19; H04W 76/15; H04W 76/22; H04W 76/27; H04W 76/30; H04W 76/32; H04W 72/08; H04W 72/12; H04W 71/14; H04W 36/00; H04W 36/02; H04W 36/08; H04W 36/18; H04W 28/02; H04W 28/12; H04W 24/04; H04W 24/10; H04L 5/00; H04L 1/00; H04L 1/08; H04L 1/18; H04L 12/46; H04L 47/24
USPC .......................................................... 370/328
See application file for complete search history.

(56) References Cited

U.S. PATENT DOCUMENTS

| | | | | |
|---|---|---|---|---|
| 10,708,968 B2 * | 7/2020 | Kim | ...................... | H04W 76/12 |
| 11,190,989 B2 * | 11/2021 | Sirotkin | ............ | H04W 36/0033 |
| 11,596,012 B2 * | 2/2023 | Xu | ...................... | H04W 88/085 |
| 11,877,327 B2 * | 1/2024 | Li | ......................... | H04W 24/02 |
| 11,895,726 B2 * | 2/2024 | Park | ...................... | H04W 76/27 |

(Continued)

OTHER PUBLICATIONS

"5G; NG-RAN; Architecture description (3GPP TS 38.401 version 17.5.0 Release 17)" ETSI TS 138 401 V17.5.0, Jul. 2023, 126 pages.

(Continued)

*Primary Examiner* — Man U Phan
(74) *Attorney, Agent, or Firm* — Amin, Turocy & Watson, LLP

(57) ABSTRACT

Enhanced CU-UP change associated with a device can be performed and managed. CU-CP can trigger transition from source CU-UP to target CU-UP. Before bearer context modification request is communicated from CU-CP to source CU-UP, CU-CP can effectuate communication path update to transition from first uplink path, associated with source CU-UP, DU, and UPF, to second uplink path, associated with target CU-UP, DU, and UPF. Target CU-UP can buffer uplink data until CU-CP receives uplink PDCP count from source CU-UP and forwards that count to target CU-CP. CU-CP or UPF can transition or facilitate transitioning from first downlink path associated with source CU-UP, DU, and UPF, to second downlink path, associated with target CU-UP, DU, and UPF. Target CU-UP can buffer downlink data until CU-CP receives downlink PDCP count from source CU-UP and forwards that count to target CU-CP. Source CU-UP can transfer remaining downlink data it has to DU.

20 Claims, 10 Drawing Sheets

(56) References Cited

U.S. PATENT DOCUMENTS

| | | | | |
|---|---|---|---|---|
| 12,490,316 | B2 * | 12/2025 | Li | H04W 48/08 |
| 12,501,281 | B2 * | 12/2025 | Singhal | H04L 41/0895 |
| 12,507,129 | B2 * | 12/2025 | Chandrashekar | H04W 12/04 |
| 2022/0201777 | A1 * | 6/2022 | Teyeb | H04L 45/302 |
| 2023/0328604 | A1 * | 10/2023 | Teyeb | H04W 36/0235 370/331 |
| 2023/0413371 | A1 * | 12/2023 | Godin | H04W 12/04 |
| 2024/0284283 | A1 * | 8/2024 | Akl | H04W 36/08 |
| 2025/0212286 | A1 * | 6/2025 | Mihara | H04W 76/22 |

OTHER PUBLICATIONS

"5G; NG-RAN; E1 Application Protocol (E1AP) (3GPP TS 38.463 version 16.6.0 Release 16)" ETSI TS 138 463 V16.6.0, Aug. 2021, 242 pages.

"OpenRAN" Telecom Infra Project. [https://telecominfraproject.com/openran/] retrieved Aug. 5, 2025, 22 pages.

"OpenRAN at a glance" Telecom Infra Project. [https://cdn.mediavalet.com/usva/telecominfraproject/kE08KPkasEm4MiXDjPpu1w/juUKWGswtE-BluDD-hOOvQ/Original/OpenRAN_ataglance_plus_Glossy_v08_2021_06_16.pdf], 2021, 7 pages.

* cited by examiner

UPLINK AND DOWNLINK DATA PATH ENHANCEMENTS FOR CU-UP CHANGE

BACKGROUND

A fifth generation (5G)-new radio (NR) base station, which also can be referred to as a gNodeB (gNB), can be logically divided into several components, which can allow for flexibility of deployment. The base station can comprise a distributed unit (DU), which also can be referred to as gNB-DU, and can handle baseband and layer 2 (L2) functionality associated with the base station; a central unit (CU)-control plane (CP), which also can be referred to as gNB-CU-CP, and can handle layer 3 (L3) control plane functionality associated with the base station; and a CU-user plane (UP), which also can be referred to as gNB-CU-UP, and can handle data traffic between the core network (e.g., 5G core network) and the DUs to which the CU-UP is connected.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise initiating, by a system comprising a processor, a communication path update with regard to a device associated with a distributed unit. The method also can include, prior to a bearer context modification request being communicated from a central unit-control plane node to a source central unit-user plane node, effectuating, by the system, the communication path update to transition from a first data communication path, associated with the source central unit-user plane node, the distributed unit, and a user plane function node, to a second data communication path, associated with a target central unit-user plane node, the distributed unit, and the user plane function node, to facilitate communication of data associated with the device between the distributed unit and the user plane function node.

In certain embodiments, the disclosed subject matter can comprise a system that can comprise a memory that can store computer executable components, and a processor that can execute computer executable components stored in the memory. The computer executable components can comprise a distributed unit associated with a user equipment. The computer executable components also can comprise a central unit-control plane component that, before a bearer context modification request is communicated from the central unit-control plane component to a source central unit-user plane component, can initiate performance of a communication path update to switch from a first data communication path, associated with the source central unit-user plane component, the distributed unit, and a user plane function component, to a second data communication path, associated with a target central unit-user plane component, the distributed unit, and the user plane function component, to facilitate communication of data associated with the user equipment between the distributed unit and the user plane function component.

In still other embodiments, the disclosed subject matter can comprise a non-transitory machine-readable medium, comprising executable instructions that, when executed by a processor, can facilitate performance of operations. The operations can comprise: in response to detecting a defined condition associated with a source central unit-user plane node associated with a distributed unit and a user equipment, triggering a communication path update relating to a first data communication path associated with the source central unit-user plane node. The operations also can comprise: prior to a bearer context modification request being communicated from a central unit-control plane node to the source central unit-user plane node, performing the communication path update to switch from the first data communication path, associated with the source central unit-user plane node, the distributed unit, and a user plane function node, to a second data communication path, associated with a target central unit-user plane node, the distributed unit, and the user plane function node, to facilitate communication of data associated with the user equipment between the distributed unit and the user plane function node.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
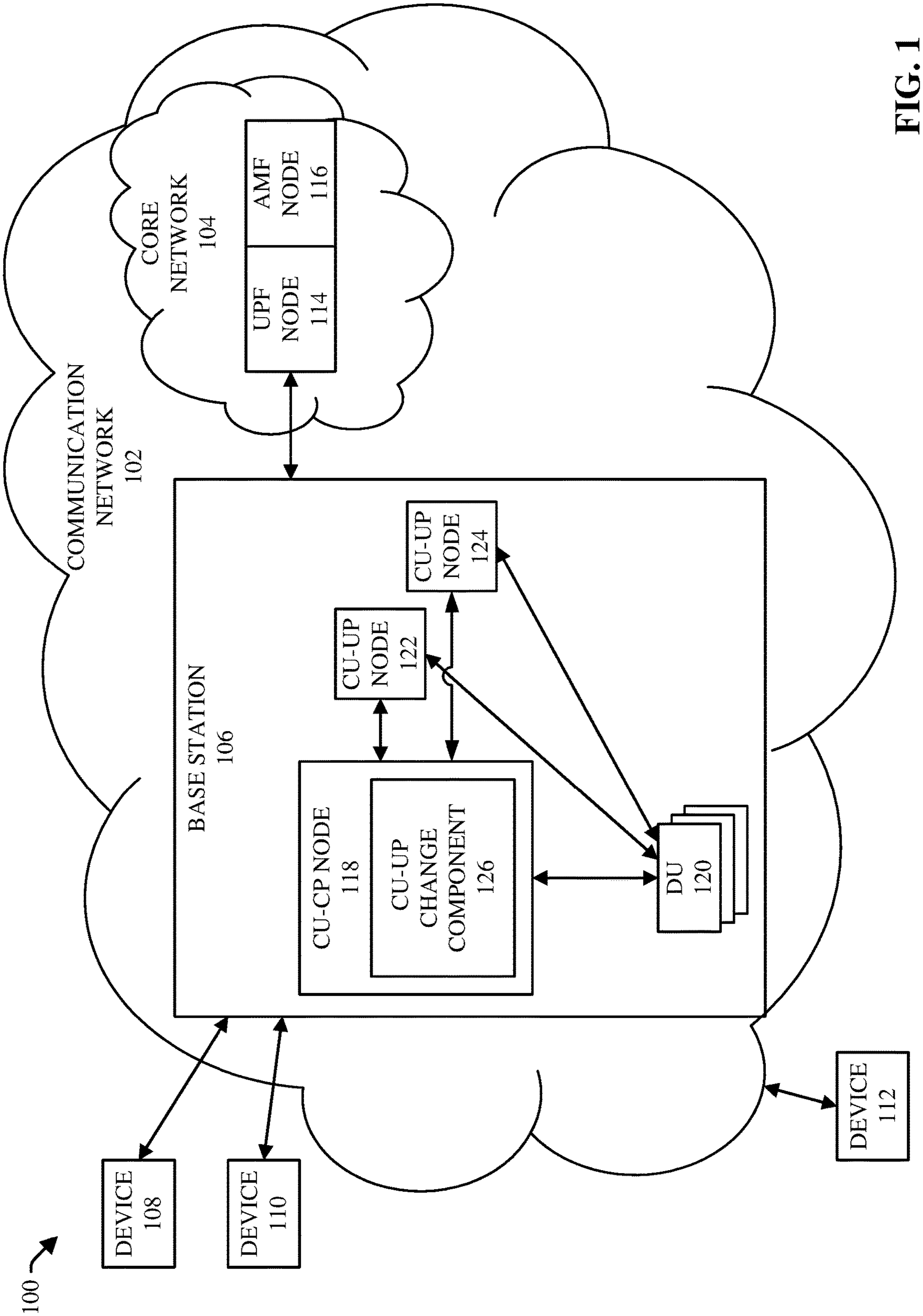
FIG. 1 illustrates a block diagram of a non-limiting example system that can desirably perform a CU-UP change, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to managing and performing enhanced central unit (CU)-user plane (UP) change, including uplink and downlink data path enhancements for CU-UP change. A fifth generation (5G)-new radio (NR) base station, which also can be referred to as a gNodeB (gNB), can be logically divided into several components, which can allow for flexibility of deployment. For instance, the base station can comprise a distributed unit (DU), which also can be referred to as gNB-DU. The DU can be a logical node that can host or handle baseband (e.g., physical (PHY)) and layer 2 (L2) (e.g., medium access control (MAC) and radio link control (RLC) layer) functionality associated with the base station. The base station also can comprise a CU-control plane (CP), which also can be referred to as gNB-CU-CP. The CU-CP (also referred to as a CU-CP node) can be a logical node that can host or handle layer 3 (L3) (e.g., radio resource control (RRC) and packet data convergence protocol (PDCP) layer) control plane functionality associated with the base station. The base station further can comprise a CU-UP, which also can be referred to as gNB-CU-UP. The CU-UP (also referred to as a CU-UP node) can be a logical node that can host or handle data traffic between the core network (e.g., 5G core network) and the DUs to which the CU-UP is connected. User equipment (UE) can be associated with (e.g., communicatively connected to) a DU to facilitate communicating data traffic to the core network and/or another communication device associated with the core network or other associated communication network.

There can be tens of DUs that can be connected to upwards of several thousand active UEs. As a result, the amount of data traffic (e.g., voice, other audio, video, or other data traffic) that can be handled at the CU-UP node can be relatively large. Further, there can be intermittent spikes in data traffic and busy hour usage of UEs that can lead to an overload condition in the CU-UP node. Existing technology can provide a method to inform the controlling CU-CP node about such an overload condition at the CU-UP node, so that an appropriate load balancing action can be taken, such as shifting some of the data traffic associated with the CU-UP node to another CU-UP node.

For instance, the CU-UP node may monitor load conditions associated with the serving CU-UP node, and may eventually decide to make a CU-UP change for some of the UE connections on the serving CU-UP node (e.g., source CU-UP node) to have those UEs served by another CU-UP node (e.g., target CU-UP node). This CU-UP change procedure can operate in a deployment scenario where the CU-CP node controls both of the CU-UP nodes (e.g., source CU-UP node and target CU-UP node) through an E1 interface. When the CU-UP node determines that a switch from the source CU-UP node to the target CU-UP node is to be made based on overload condition indications from the source CU-UP node, the CU-CP node can identify another CU-UP node (e.g., the target CU-UP node) that has a relatively lower load (e.g., a lower load than the source CU-UP node and/or is not overloaded), and can exchange messages (e.g., E1 application protocol (E1AP) messages) with both the source CU-UP node and the target CU-UP node to facilitate the switching of some data traffic from the source CU-UP node to the target CU-UP node. The uplink data can be buffered at the target CU-UP node and downlink data can be buffered at the source CU-UP node for the duration of the CU-UP change procedure. Uplink data transfer can resume after PDCP context is transferred from the source CU-UP node to the target CU-UP node, and the downlink data transfers can resume after the buffered downlink data is transferred from the source CU-UP node to the target CU-UP node.

There can be a number of problems or deficiencies with regard to the existing CU-UP change procedure. For instance, there may be no forwarding path between the source CU-UP node and target CU-UP node. In some cases, it may be that a path between the source CU-UP node and target CU-UP node does not exist due to no provisioning of such path as part of the deployment and the transport network not being configured. In such cases, the CU-CP node cannot take the action of changing the CU-UP, and this can lead to loss of data packets (e.g., data packet drops). If this becomes inevitable due to an overload condition associated with the source CU-UP node, the buffered data packets at the source CU-UP node can be lost since there is no forwarding path to the target CU-UP node.

Another problem or deficiency with regard to the existing CU-UP change procedure can be that there may be CU-UP change procedure delay limitations. In the existing CU-UP change procedure, the CU-CP node can first exchange messages with the target CU-UP node to prepare the target CU-UP node for a new UE connection, the CU-CP node also can communicate with the DU to facilitate reconfiguring the DU, the CU-CP node further can exchange messages with the source CU-UP node to inform the source CU-UP node of the CU-UP change and to retrieve PDCP context from the source CU-UP node, the CU-UP node further can exchange more messages with the target CU-UP node with regard to general packet radio service (GPRS) tunnelling protocol (GTP) tunnel information from the DU to facilitate forwarding downlink data. This is a significant amount of messaging that can occur during a time when the source CU-UP node can be undesirably overloaded with data traffic. Since the source CU-UP node already can be overloaded, data packet drops can occur by the time these message exchanges are performed and the path switch towards the user plane function (UPF) node of the core network is completed. In the meantime, the UPF node can continue to send downlink data during this existing CU-UP change procedure, and the already overloaded source CU-UP node undesirably (e.g., unsuitably, unwantedly, or inefficiently) can have to buffer these data packets of downlink data to later transfer such downlink data packets to the target CU-UP node. This delayed transfer of buffered data during a period of congestion or overload of the source CU-UP node can lead to loss of some or all of those data packets, and eventually a communication drop (e.g., call drop) can occur with regard to the UE associated with the communication. As a result, the existing CU-UP change procedure, at least during overload condition associated with the source CU-UP node, can undesirably lead to data packet loss, delays, and communication performance degradation overall.

The disclosed subject matter can address and overcome these and other deficiencies of existing techniques with regard to CU-UP changes. In that regard, it can be desirable (e.g., wanted, advantageous, beneficial, or optimal) to have an enhanced alternative mechanism that can obviate having to have a forwarding path to forward data packets from the source CU-UP node to the target CU-UP node. It also can be desirable (e.g., wanted, advantageous, beneficial, or optimal) to perform a lossless CU-UP change that can eliminate, minimize, or avoid loss of data packets during the CU-UP change. It further can desirable (e.g., wanted, advantageous, beneficial, or optimal) to reduce, minimize, or avoid buffering of data packets at the source CU-UP node during the CU-UP change, including reducing, minimizing, or avoiding buffering of uplink data packets by the source CU-UP node for delay sensitive applications (as well as other applications).

The disclosed subject matter can employ enhanced CU-UP change techniques that can desirably (e.g., advantageously, beneficially, enhancedly, or optimally) have an enhanced alternative mechanism that can obviate having to have a forwarding path to forward data packets from the source CU-UP node to the target CU-UP node (e.g., during the CU-UP change); perform a lossless CU-UP change that can eliminate, minimize, or avoid loss of data packets during the CU-UP change; and reduce, minimize, or avoid buffering of data packets at the source CU-UP node during the CU-UP change, including reducing, minimizing, or avoiding buffering of uplink data packets by the source CU-UP node for delay sensitive applications (as well as other applications).

To that end, techniques that can desirably (e.g., suitably, reliably, efficiently, enhancedly, and/or optimally) manage and perform enhanced CU-UP changes are presented. A system can comprise an enhanced base station (e.g., gNB or other NR-type or xG base station, wherein x can be a number greater than 5) that can employ uplink and downlink data path enhancements during a CU-UP change from a source CU-UP to a target CU-UP with respect to a device associated with a DU of the base station, such as described herein. In some embodiments, during a CU-UP change, the base station can employ or implement both the uplink data path enhancements and the downlink data path enhancements to transition the uplink data communication path and downlink data communication path from the source CU-UP node to the target CU-UP node. In other embodiments, if and as desired, during a CU-UP change, the base station can employ or implement the uplink data path enhancements to transition the uplink data communication path from the source CU-UP node to the target CU-UP node, while employing other techniques (e.g., instead of or besides the disclosed downlink data path enhancements) to transition the downlink data communication path from the source CU-UP node to the target CU-UP node. In still other embodiments, if and as desired, during a CU-UP change, the base station can employ or implement the downlink data path enhancements to transition the downlink data communication path from the source CU-UP node to the target CU-UP node, while employing other techniques (e.g., instead of or besides the disclosed uplink data path enhancements) to transition the uplink data communication path from the source CU-UP node to the target CU-UP node.

In certain embodiments, a CU-CP node (e.g., employing an enhanced CU-UP change component) of the base station can initiate or trigger a communication path update to transition from the source CU-UP node to the target CU-UP node with respect to a DU of the base station and the device (e.g., UE, cellular or smart phone, electronic pad or tablet, or other device) associated with (e.g., communicatively connected to) the DU. In some embodiments, during the CU-UP change process, prior to a bearer context modification request being communicated from the CU-CP node to the source CU-UP node, the CU-CP node, in conjunction with other components (e.g., DU and/or other network component), can effectuate the communication path update to transition from a first uplink data communication path, associated with the source CU-UP node, DU, and UPF node, to a second uplink data communication path, associated with the target CU-UP node, DU, and UPF node. In connection with this data communication path transition, the CU-CP node can request that the DU reconfigure itself to communicate uplink data to the target CU-UP node. The DU can perform such reconfiguration based at least in part on information relating to the target CU-UP node (e.g., uplink tunnel endpoint identifier (TEID) for the user plane interface between the base station and core network (e.g., uplink NG-U TEID)) that can be received with the request from the CU-CP node.

With the DU reconfigured, the target CU-UP node can begin receiving uplink data associated with the device from the DU via the second uplink data communication path, and can (e.g., initially can) buffer uplink data received from the DU, until the CU-CP node receives an uplink PDCP count value from the source CU-UP node and forwards that uplink PDCP count value to the target CU-CP node. Subsequently, in response to receiving the uplink PDCP count value from the CU-CP node, the target CU-UP node can transfer the buffered uplink data, and any uplink data it subsequently receives from the DU, to the UPF node of the core network, via the second uplink data communication path, and the UPF node can communicate such uplink data to a desired destination (e.g., another communication device or other desired destination).

In certain embodiments, the CU-CP node, UPF node, and/or another network component also can transition or facilitate transitioning from a first downlink data communication path associated with the source CU-UP node, DU, and UPF node, to a second downlink data communication path, associated with the target CU-UP node, DU, and UPF node. The target CU-UP node can buffer downlink data it receives from the UPF node via the second downlink data communication path until the target CU-UP node receives a downlink PDCP count value from the CU-CP node, such as described herein.

In the meantime, the source CU-UP node can continue to transfer any remaining downlink data that the source CU-UP node may have to the DU via the first downlink data communication path. The source CU-UP node also can receive an end marker from the UPF node. In response to receiving the end marker, and in response to a previously received bearer context modification request (e.g., requesting the downlink PDCP count value), from the CU-CP node, the source CU-UP node can communicate the downlink PDCP count value to the CU-CP node, which can communicate the downlink PDCP count value to the target CU-UP node. After the source CU-UP node has transferred all of the remaining downlink data that it may have to the DU via the first downlink data communication path, the source CU-UP can communicate the end marker to the DU. In response to receiving the end marker, the DU can communicate a downlink data delivery status message to the target CU-UP node. In response to receiving the downlink PDCP count value from the CU-CP node, and in response to receiving the downlink data delivery status message from the DU, the target CU-UP node can transfer the buffered downlink data, and any downlink data it subsequently receives from the UPF node, to the DU, via the second downlink data communication path, and the DU can communicate such downlink data to the device.

The disclosed enhanced CU-UP change process employed by the base station (e.g., including the enhanced CU-UP change component), by performing the data communication path change (e.g., from the first uplink data communication path associated with the source CU-UP node to the second uplink data communication path associated with the target CU-UP node) earlier than existing CU-UP change techniques (e.g., prior to a bearer context modification request being communicated from the CU-CP node to the source CU-UP node), desirably (e.g., suitably, reliably, efficiently, enhancedly, and/or optimally) can result in uplink and downlink data associated with the device being processed at the target CU-UP node (and doing so significantly earlier in the CU-UP change process). This early data communication path change (e.g., data path enhancement) implemented by the enhanced CU-UP change process also desirably (e.g., suitably, reliably, efficiently, enhancedly, and/or optimally) can avoid or at least minimize having to buffer data associated with the device at the source CU-UP node, since the target CU-UP node can start buffering the data associated with the device until the PDCP context information (e.g., the uplink PDCP count value and/or other PDCP context information) is obtained from the source CU-UP node by the CU-CP node and provided to the target CU-UP node in subsequent operations of the disclosed enhanced CU-UP change process, such as described herein. Further, by employing the disclosed enhanced CU-UP change process, the base station can reduce or facilitate reducing uplink data buffering for delay sensitive applications (as well as other applications) by having the CU-CP node obtain the uplink PDCP count and forwarding that uplink PDCP count to the target CU-UP node before the data communication path switch towards the core network is performed, such as described herein. Furthermore, this early data communication path change of the disclosed enhanced CU-UP change process desirably (e.g., suitably, reliably, efficiently, enhancedly, and/or optimally) can enable the base station to perform a lossless CU-UP change without having to perform downlink data forwarding between the source CU-UP node and the target CU-UP node and without there having to be a communication path or link between the source CU-UP node and the target CU-UP node.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, reliably, suitably, enhancedly, or optimally) perform a CU-UP change, in accordance with various aspects and embodiments of the disclosed subject matter. The system 100 can comprise a communication network 102 that can comprise a core network 104 and one or more base stations, including base station 106, that can be associated with (e.g., communicatively connected to) the core network 104. The core network 104 and the one or more base stations (e.g., base station 106) can facilitate (e.g., enable) wireless communication of data (e.g., voice or other audio data, video data, textual data, or other data) between devices (e.g., communication devices or UEs), such as devices associated with the core network 104, via the one or more base stations, and other devices associated with the core network 104 or, more generally, the communication network 102 (e.g., a device, such as a server or computer, can be connected to the communication network 102 via a wireline connection or via a network other than the core network 104).

The devices can comprise, for example, devices 108, 110, and/or 112. A device (e.g., 108, 110, or 112) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device 108 can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the core network 104 can comprise a UPF node 114, an access and mobility management function (AMF) node 116, and/or other network functions. The UPF node 114 can connect to or interface with the one or more base stations (e.g., base station 106), can be an interconnect point between the core network and a data network, can provide or facilitate providing a protocol data unit (PDU) session anchor point for providing mobility associated with radio access technologies (RATs), can provide or facilitate providing data packet routing or forwarding, and/or can perform or manage other functions. The AMF node 116 can be a control plane function that can manage registration and deregistration of devices (e.g., devices 108, 110, and/or 112) with the core network 104, manage connections of devices with the core network 104, manage mobility associated with devices (e.g., maintain knowledge of locations of devices, update locations of devices), and/or manage or perform other functions.

The communication network 102, more generally, or the core network 104 can comprise various other network equipment (e.g., routers, gateways, transceivers, switches, access points, radio access networks (RANs), or other devices) that facilitate (e.g., enable) communication of information between respective items of network equipment of the communication network 102, and/or communication of information between the one or more devices (e.g., devices 108, 110, and/or 112) and the communication network 102. The communication network 102, including the core network 104, can provide or facilitate wireless or wireline communication connections and channels between the one or more devices (e.g., devices 108, 110, and/or 112), and/or respectively associated services or application, and the communication network 102. For reasons of brevity or clarity, some of the various network equipment, components, functions, or devices of the communication network may not be explicitly shown.

In some embodiments, the base station 106 can be a 5G or other NR base station (e.g., gNB or other NR-type or xG base station, wherein x can be a number greater than 5). The base station 106 can comprise a CU-CP node 118 (e.g., a gNB or other NR-NB CU-CP node), one or more DUs (e.g., a gNB or other NR-NB DUs), including DU 120, a desired number of CU-UP nodes (e.g., a gNB or other NR-NB CU-UP nodes), including CU-UP node 122 and CU-UP node 124, and/or other network equipment. The CU-CP node 118 can be associated or interfaced with the DUs (e.g., DU 120) via an interface (e.g., F1-C interface) or connection. The CU-CP node 118 can be associated or interfaced with the CU-UP nodes (e.g., CU-UP nodes 122 and/or 124) via an interface (e.g., E1 interface) or connection. The CU-UP nodes (e.g., CU-UP nodes 122 and/or 124) can be associated or interfaced with the DUs (e.g., DU 120) via an interface (e.g., F1-U interface) or connection.

A DU (e.g., DU 120) can provide support for lower layers of the protocol stack. For instance, a DU (e.g., DU 120) can be a logical node that can host or handle baseband (e.g., PHY) and L2 (e.g., MAC and RLC layer) functionality associated with the base station 106. The CU-UP nodes (e.g., CU-UP nodes 122 and/or 124) can be logical nodes that can host or handle data traffic between the core network 104 (e.g., 5G or other NR or xG core network) and the DUs (e.g., DU 120) to which the particular CU-UP is connected. The CU-CP node 118 can be a logical node that can host or handle L3 (e.g., RRC and PDCP layer) control plane functionality associated with the base station 106.

At various times, it can be desirable (e.g., wanted, needed, or optimal) to transition (e.g., switch) one or more device connections (e.g., UE connections) from one CU-UP node 122 (e.g., also referred to herein as a source CU-UP node 122) to another CU-UP node 124 (e.g., also referred to herein as a target CU-UP node 124). For instance, if the CU-CP node 118 or other component of the base station 106 or core network 104 determines or detects that the source CU-UP node 122 is under or subject to a defined condition that indicates moving or transitioning one or more device connections from the source CU-UP node 122 to the target CU-UP node 124 can be desirable, the CU-CP node 118 can determine that a CU-UP change is to be performed, and can initiate, perform, effectuate, or facilitate performing or effectuating the CU-UP change to transition (e.g., change or switch) the one or more device connections from the source CU-UP node 122 to the target CU-UP node 124. The defined condition can comprise, for example, a defined load or congestion condition (e.g., a level of network or load congestion that satisfies (e.g., is at or exceeds) a defined threshold network or load congestion level, even if not considered overloaded), a defined overload condition (e.g., a load level that satisfies (e.g., is at or exceeds) a defined threshold load level that indicates an overload exists), or other defined condition (e.g., network and/or operational condition) associated with a CU-UP node (e.g., source CU-UP node 122).

To that end, in accordance with various embodiments, the CU-CP node 118 can comprise a CU-UP change component 126 (also referred to herein as an enhanced CU-UP change component 126) that can desirably (e.g., efficiently, reliably, suitably, enhancedly, or optimally) perform CU-UP changes to transition device connections from source CU-UP nodes (e.g., source CU-UP node 122) to target CU-UP nodes (e.g., target CU-UP node 124). The CU-UP change component 126 can employ uplink data path enhancements and/or downlink data path enhancements for CU-UP changes, such as described herein. The CU-UP change component 126 can work in conjunction with other network components, including the DUs (e.g., DU 120), the UPF node 114, the AMF node 116, the CU-UP nodes (e.g., source CU-UP node 122, and the target CU-UP node 124), and/or other network components to facilitate performing CU-UP changes (e.g., enhanced CU-UP changes).

In some embodiments, during a CU-UP change from a source CU-UP node (e.g., source CU-UP node 122) to a target CU-UP node (e.g., a target CU-UP node 124), the base station 106 (e.g., employing the enhanced CU-UP change component 126) can employ or implement both the uplink data path enhancements and the downlink data path enhancements to transition the uplink data communication path and downlink data communication path from the source CU-UP node to the target CU-UP node. In other embodiments, if and as desired, during a CU-UP change, the base station 106 (e.g., employing the enhanced CU-UP change component 126) can employ or implement the uplink data path enhancements to transition the uplink data communication path from the source CU-UP node to the target CU-UP node, while employing other techniques (e.g., instead of or besides the disclosed downlink data path enhancements) to transition the downlink data communication path from the source CU-UP node to the target CU-UP node. In still other embodiments, if and as desired, during a CU-UP change, the base station 106 (e.g., employing the enhanced CU-UP change component 126) can employ or implement the downlink data path enhancements to transition the downlink data communication path from the source CU-UP node to the target CU-UP node, while employing other techniques (e.g., instead of or besides the disclosed uplink data path enhancements) to transition the uplink data communication path from the source CU-UP node to the target CU-UP node.

Figure 2:
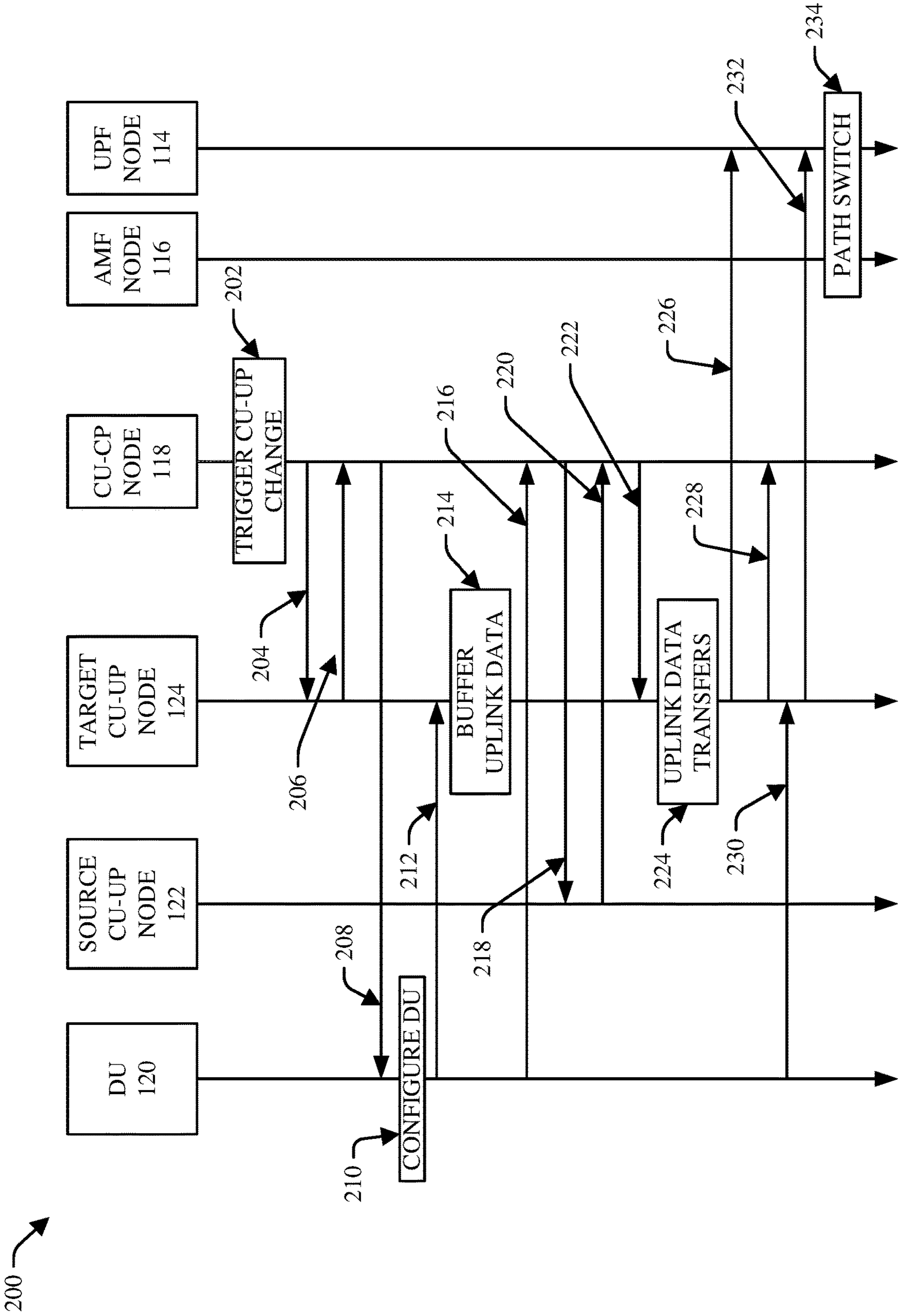
FIGS. 2 and 3 depict a diagram of a non-limiting example enhanced central unit (CU)-user plane (UP) (CU-UP) change process that can utilized to desirably perform a CU-UP change from a source CU-UP node to a target CU-UP node with respect to a device associated with the base station, in accordance with various aspects and embodiments of the disclosed subject matter.
Figure 3:
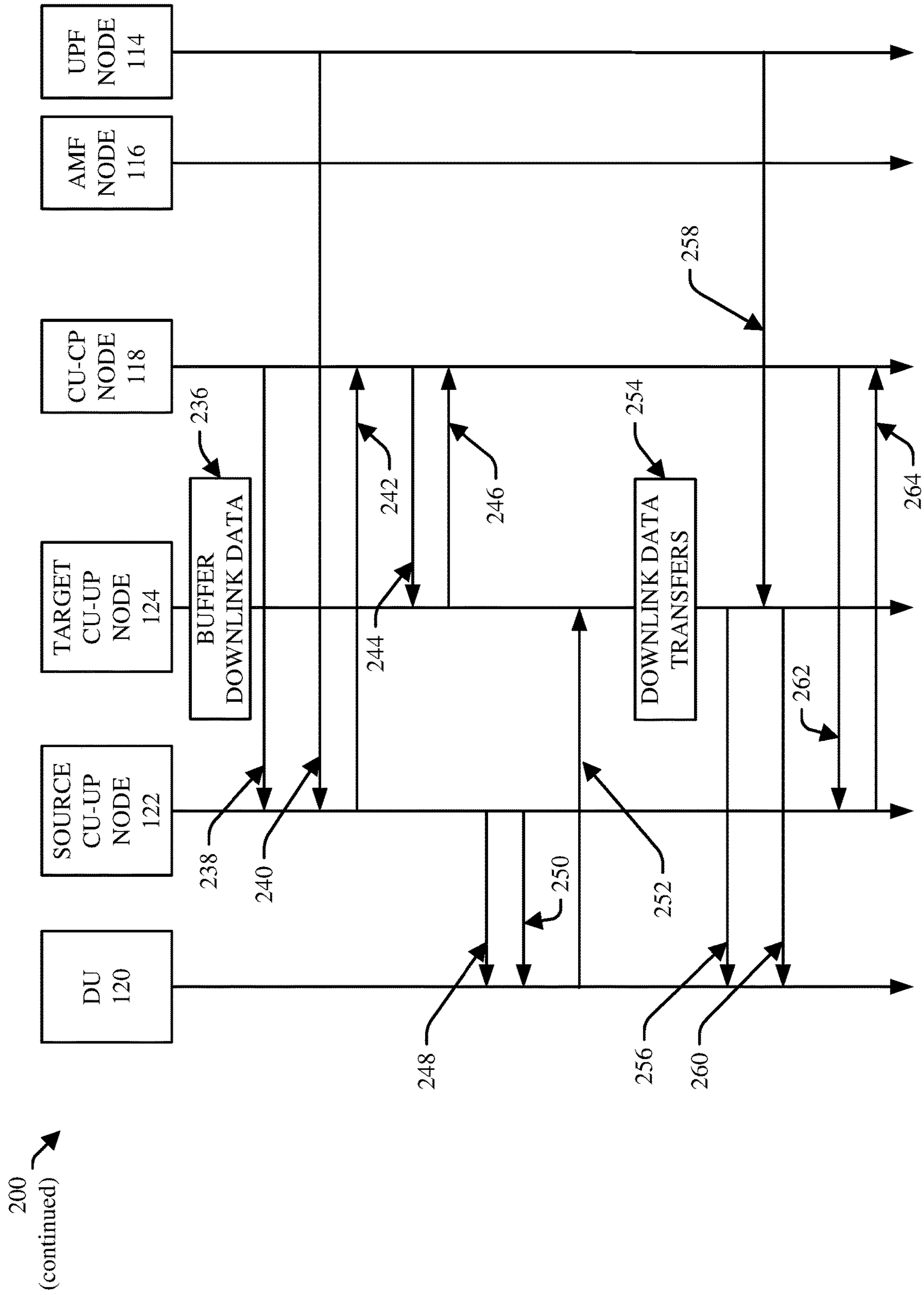

Referring to FIGS. 2 and 3 (along with FIG. 1), FIGS. 2 and 3 depict a diagram of a non-limiting example enhanced CU-UP change process 200 that can utilized to desirably (e.g., efficiently, reliably, suitably, enhancedly, or optimally) perform a CU-UP change from a source CU-UP node to a target CU-UP node with respect to a device associated with the base station, in accordance with various aspects and embodiments of the disclosed subject matter. The CU-UP node 118, employing the CU-UP change component 126, and working in conjunction with other network components (e.g., the DU 120, the UPF node 114, the AMF node 116, the source CU-UP node 122, and the target CU-UP node 124) can perform (e.g., execute) the example enhanced CU-UP change process 200 to perform the CU-UP change to transition a device connection associated with a device (e.g., device 108) from the source CU-UP node 122 to the target CU-UP node 124. As part of such CU-UP change, the CU-UP change component 126 can employ the uplink data path enhancements and/or downlink data path enhancements to transition or facilitate transitioning from the uplink and downlink data communication paths associated with the source CU-UP node 122 to uplink and downlink data communication paths associated with the target CU-UP node 124, in accordance with the enhanced CU-UP change process 200.

Initially, the device 108 can be connected to the base station 106, via the DU 120, wherein the source CU-UP node 122 and the DU 120 can be serving the device 108 by performing or facilitating performing downlink data transfers of downlink data to the device 108 from a data source (e.g., another device, such as device 112, or a network component of the communication network 102 or core network 104), via the UPF node 114, and uplink data transfers of uplink data from the device 108 to a desired destination (e.g., the data source), via the UPF node 114.

As indicated at reference numeral 202 of the enhanced CU-UP change process 200, the CU-CP node 118 can initiate or trigger a CU-UP change to change the CU-UP node associated with the device 108 from the source CU-UP node 122 to the target CU-UP node 124. The CU-CP node 118 can initiate or trigger this CU-UP change, for example, in response to determining or detecting that the source CU-UP node 122 is under or subject to a defined condition (e.g., an overload condition or other condition) that indicates moving or transitioning one or more device connections, including the device connection associated with the device 108, from the source CU-UP node 122 to the target CU-UP node 124 can be desirable (e.g., wanted, needed, or optimal). In some embodiments, the CU-CP node 118 can receive status indicator information from the source CU-UP node 122 (e.g., via the E1 interface), wherein the status indicator information can indicate or specify that the source CU-UP node 122 is under or subject to the defined condition.

As indicated at reference numeral 204 of the enhanced CU-UP change process 200, the CU-CP node 118 can communicate a bearer context setup request message to the target CU-UP node 124. The bearer context setup request message can request that the target CU-UP node 124 set up a bearer context, and can comprise uplink transport network layer (TNL) address information for the user plane interface between the NG-RAN (e.g., base station 106) and the core network 104 (e.g., for the NG-U interface) (or for an S1-U interface), uplink tunnel endpoint identifier (TEID) for the user plane interface between the base station 106 and core network 104 (e.g., uplink NG-U TEID), and/or other desired information.

As specified at reference numeral 206 of the enhanced CU-UP change process 200, the CU-CP node 118 can receive a bearer context setup response message from the target CU-UP node 124. In response to receiving the bearer context setup request message, the target CU-UP node 124 can generate the bearer context setup response message. The bearer context setup response message can comprise, for example, the uplink TNL address information for the interface (e.g., user plane interface) between the target CU-UP node 124 and the DU 120 (e.g., for the F1-U interface), an uplink F1-U TEID associated with the target CU-UP node 124, downlink TNL address information for the user plane interface between the NG-RAN (e.g., base station 106) and the core network 104 (e.g., for the NG-U interface) (or the S1-U interface), a downlink user plane interface TEID (e.g., NG-U TEID), and/or other desired information associated with the target CU-UP node 124.

In some embodiments, in response receiving the bearer context setup response message from the target CU-UP node 124, the CU-CP node 118 can initiate, effectuate, perform, or facilitate effectuating or performing the uplink data communication path switch towards the DU 120 from the source CU-UP node 122 to the target CU-UP node 124 and can initiate, effectuate, perform, or facilitate effectuating or performing the downlink data communication path switch towards the core network 104 (e.g., the UPF node 114 of the core network 104) from the source CU-UP node 122 to the target CU-UP node 124 simultaneously (or at least substantially simultaneously), concurrently, and/or in parallel, or in close temporal proximity to (e.g., within a relatively short amount of time of) each other. It is to be appreciated and understood that, in other embodiments, if and as desired, the CU-CP node 118 initially can initiate, effectuate, perform, or facilitate effectuating or performing the uplink data communication path switch towards the DU 120 from the source CU-UP node 122 to the target CU-UP node 124 at a first time, and, at a subsequent time, the CU-CP node 118 can initiate, effectuate, perform, or facilitate effectuating or performing the downlink data communication path switch towards the core network 104 from the source CU-UP node 122 to the target CU-UP node 124. In still other embodiments, if and as desired, the CU-CP node 118 initially can initiate, effectuate, perform, or facilitate effectuating or performing the downlink data communication path switch towards the core network 104 from the source CU-UP node 122 to the target CU-UP node 124 at a first time, and, at a subsequent time, the CU-CP node 118 can initiate, effectuate, perform, or facilitate effectuating or performing the uplink data communication path switch towards the DU 120 from the source CU-UP node 122 to the target CU-UP node 124.

As indicated at reference numeral 208 of the enhanced CU-UP change process 200, desirably (e.g., suitably, efficiently, enhancedly, and/or optimally), prior to a bearer context modification request message being communicated from the CU-CP node 118 to the source CU-UP node 122, the CU-CP node 118 can communicate an interface (e.g., F1 interface) and UE context modification request message to the DU 120 to request that the DU 120 modify one or more bearers with respect to the device and the interface (e.g., F1 interface), to facilitate transitioning from the source CU-UP node 122 to the target CU-UP node 124 with respect to the DU 120 and associated device 108. The interface and UE context modification request message can comprise information, such as the uplink TEID for the F1-U interface (e.g., the uplink F1-U TEID) associated with the target CU-UP node 124.

As specified at reference numeral 210 of the enhanced CU-UP change process 200, in response to the DU 120 receiving the interface and UE context modification request message from the CU-CP node 118, and based at least in part on the information (e.g., the uplink F1-U TEID) contained therein, the DU 120 can be configured or reconfigured, and can transition (e.g., change or switch) from a first uplink data communication path associated with the source CU-UP node 122 to a second uplink data communication path associated with the target CU-UP node 124 to facilitate communication of uplink data via the second uplink data communication path and the target CU-UP node 124, instead of via the first uplink data communication path and the source CU-UP node 122. At this point, the target CU-UP node 124 can be ready to receive, can receive, and can buffer downlink data (e.g., in a buffer component of the target CU-UP node 124), such as described herein. In some embodiments, if the CU-UP node 118 initiated, effectuates, performed, or facilitated effectuating or performing the downlink data communication path change switch simultaneously, concurrently, and/or in parallel with, or in close temporal proximity to (e.g., within a relatively short amount of time of), initiating, effectuating, performing, or facilitating effectuating or performing the uplink data communication path change switch, the downlink data communication path switch (such as more fully described herein) may be in progress or completed at this point. Once the downlink data communication path switch has been completed, the target CU-UP node 124 can be ready to receive, can receive, and can buffer downlink data (e.g., in the buffer component of the target CU-UP node 124), such as described herein.

As indicated at reference numeral 212 of the enhanced CU-UP change process 200, the DU 120 can communicate uplink data associated with the device to the target CU-UP node 124. As specified at reference numeral 214 of the enhanced CU-UP change process 200, the target CU-UP node 124 can buffer the uplink data (e.g., in a buffer component of the target CU-UP node 124). For instance, the target CU-UP node 124 can receive the uplink data associated with the device from the DU 120 and can buffer the uplink data (e.g., in the buffer component), for example, at least until the target CU-UP node 124 receives an uplink packet data convergence protocol (PDCP) count value from the CU-CP node 118 (which can receive (e.g., eventually can receive) such uplink PDCP count value from the source CU-UP node 122), such as described herein. In some embodiments, this transition to the second uplink data communication path associated with the target CU-UP node 124 and the buffering of the uplink data by the target CU-UP node 124 can occur prior to the bearer context modification request message being communicated from the CU-CP node 118 to the source CU-UP node 122.

As indicated at reference numeral 216 of the enhanced CU-UP change process 200, the DU 120 can communicate an interface and UE context modification response message to the CU-CP node 118. The interface and UE context modification response message can comprise desired information, such as, for example, a downlink TEID for the F1-U interface (e.g., downlink F1-U TEID). In some embodiments, the DU can communicate such response message to the CU-CP node prior to the bearer context modification request message being communicated from the CU-CP node to the source CU-UP node.

As indicated at reference numeral 218 of the enhanced CU-UP change process 200, the CU-CP node 118 can communicate a bearer context modification request message to the source CU-UP node 122. The bearer context modification request message can request an uplink PDCP status, including the uplink PDCP count value, from the source CU-UP node 122. The uplink PDCP count value, which also can be referred to as a PDCP data protocol data unit (PDU) counter, can be indicative of the amount of data communicated (e.g., with respect to an active radio bearer(s)) during a session associated with the device 108, and can be utilized as an input value or parameter for a security algorithm or procedure that can be utilized by the base station 106 and core network 104 for secure communication of data.

As indicated at reference numeral 220 of the enhanced CU-UP change process 200, the CU-CP node 118 can receive a bearer context modification response message from the source CU-UP node 122. The bearer context modification response message can comprise the uplink PDCP status, which can include the uplink PDCP count value.

As indicated at reference numeral 222 of the enhanced CU-UP change process 200, the CU-CP node 118 can communicate a bearer context modification request message, comprising the uplink PDCP count value, to the target CU-UP node 124. As specified at reference numeral 224 of the enhanced CU-UP change process 200, in response to receiving the uplink PDCP count value from the CU-CP node 118, the target CU-UP node 124 can begin to perform uplink data transfers associated with the device 108 to the UPF node 114 via the second uplink data communication path, wherein the uplink data transfers can comprise the buffered uplink data and any subsequent (e.g., newly received) uplink data received by the target CU-UP node 124 from the DU 120. The buffered uplink data can be the uplink data the target CU-UP node 124 previously buffered in its buffer component (e.g., while waiting to receive the uplink PDCP count value from the CU-CP node 118). As indicated at reference numeral 226 of the enhanced CU-UP change process 200, the target CU-UP node 124 can communicate the buffered uplink data associated with the device 108 to the UPF node 114 via the second uplink data communication path. The UPF node 114 can communicate the buffered uplink data to or towards a desired destination (e.g., another device (e.g., 112)) of such uplink data (e.g., via one or more network components of the core network 104 or communication network 102).

As indicated at reference numeral 228 of the enhanced CU-UP change process 200, the CU-UP node 118 can receive a bearer context modification response message from the target CU-UP node 124. The bearer context modification response message can acknowledge that the uplink PDCP count value has been received by the target CU-UP node 124 and/or indicate that the bearer context modification is complete.

As specified at reference numeral 230 of the enhanced CU-UP change process 200, the target CU-UP node 124 can receive uplink data associated with the device 108 from the DU 120. As indicated at reference numeral 232 of the enhanced CU-UP change process 200, the target CU-UP node 124 can communicate the uplink data associated with the device 108 to the UPF node 114 via the second uplink data communication path. The UPF node 114 can communicate such uplink data to or towards the desired destination (e.g., another device (e.g., 112)) of such uplink data.

As specified at reference numeral 234 of the enhanced CU-UP change process 200, the UPF node 114, CU-CP node 118, and/or other network components can perform or facilitate performing a path switch procedure (e.g., a data path update) to transition (e.g., switch, modify, or change) from a first downlink data communication path associated with the source CU-UP node 122 to a second downlink data communication path associated with the target CU-UP node 124, based at least in part on the downlink user plane interface TEID (e.g., NG-U TEID) associated with the target CU-UP node 124. It is to be appreciated and understood that, in some embodiments, the CU-CP node 118 can initiate, effectuate, perform, or facilitate effectuating or performing the downlink data communication path switch towards the core network 104 (e.g., the UPF node 114 of the core network 104) from the source CU-UP node 122 to the target CU-UP node 124 simultaneously (or at least substantially simultaneously), concurrently, and/or in parallel with, or in close temporal proximity to (e.g., within a relatively short amount of time of), the CU-CP node 118 initiating, effectuate, perform, or facilitate effectuating or performing the uplink data communication path switch towards the DU 120 from the source CU-UP node 122 to the target CU-UP node 124 (e.g., in response to the CU-CP node 118 receiving the bearer context setup response message from the target CU-UP node 124, as indicated at reference numeral 206 of the enhanced CU-UP change process 200), such as described herein.

After the downlink path switch procedure has been completed, the UPF node 114 can begin to communicate downlink data associated with the device 108 (e.g., downlink data to be communicated to the device 108) to the target CU-UP node 124 via the second downlink data communication path associated with the target CU-UP node 124 and the UPF node 114. As specified at reference numeral 236 of the enhanced CU-UP change process 200, the target CU-UP node 124 can buffer (e.g., in its buffer component) the downlink data associated with the device 108 that the target CU-UP component 124 receives from the UPF node 114, for example, until the target CU-UP node 124 receives a downlink data delivery status message (e.g., NR-UP downlink data delivery status message) from the DU 120, such as described herein. It is noted that, at this point, the source CU-UP node 122 may still have some downlink data associated with the device 108 that has yet to be transferred to the DU 120. The source CU-UP node 122 desirably (e.g., suitably, enhancedly, or optimally) can continue to transfer any remaining downlink data associated with the device 108 that it may have to the DU 120, via the first downlink data communication path, until all of that downlink data has been transferred to the DU 120, such as described herein, and desirably (e.g., suitably, enhancedly, or optimally) does not have to have a forwarding data communication path to the target CU-UP node 124 and does not have to forward any remaining downlink data associated with the device 108 to the target CU-UP node 124.

As indicated at reference numeral 238 of the enhanced CU-UP change process 200, the CU-CP node 118 can communicate a bearer context modification request message, which can request a downlink PDCP count value, to the source CU-UP node 122. The source CU-UP node 122 can receive the bearer context modification request message. At this point, the source CU-UP node 122 can wait until it receives an end marker from the UPF node 114 before the source CU-UP node 122 sends a bearer context modification response message to the CU-CP node 118.

As indicated at reference numeral 240 of the enhanced CU-UP change process 200, the UPF node 114 can communicate the end marker to the source CU-UP node 122, in connection with the transitioning of the communication of downlink data associated with the device 108 from the first downlink data communication path associated with the source CU-UP node 122 to the second downlink data communication path associated with the target CU-UP node 124. It is noted that, with regard to any downlink data remaining to be sent by the source CU-UP node 122 to the DU 120 (e.g., any downlink data the source CU-UP node 122 had buffered in its buffer component until ready to transfer to the DU 120), the source CU-UP node 122 can assign respective PDCP secondary node (SN) values to respective downlink data packets buffered at the source CU-UP node 122 and subsequently transferred to the DU 120 (e.g., via the first downlink data communication path).

As indicated at reference numeral 242 of the enhanced CU-UP change process 200, in response to receiving the end marker, the source CU-UP node 122 can communicate the bearer context modification response message, comprising the downlink PDCP count value (e.g., associated with the downlink data associated with the device 108), to the CU-CP node 118.

In response to receiving the downlink PDCP count value from the source CU-UP node 122, as indicated at reference numeral 244 of the enhanced CU-UP change process 200, the CU-CP node 118 can communicate a bearer context modification request message, comprising the downlink PDCP count value, the downlink TEID for the F1-U interface (e.g., downlink F1-U TEID), and/or other desired information, to the target CU-UP node 124. Such information can facilitate (e.g., enable) the target CU-UP node 124 to desirably communicate the buffered downlink data associated with the device 108 that the target CU-UP node 124 has, and any new downlink data associated with the device 108 that the target CU-UP node 124 receives from the UPF node 114, to the DU 120 via the second downlink data communication path.

As indicated at reference numeral 246 of the enhanced CU-UP change process 200, the CU-CP node 118 can receive a bearer context modification response message from the target CU-UP node 124. The bearer context modification response message communicated by the target CU-UP node 124 can indicate that the information contained in the bearer context modification request message has been received and/or that the bearer context modification has been completed (e.g., based at least in part on the downlink PDCP count value, the downlink F1-U TEID, and/or other desired information).

As indicated at reference numeral 248 of the enhanced CU-UP change process 200 (and as disclosed herein), the source CU-UP node 122 can continue to transfer (e.g., communicate) any remaining downlink data associated with the device 108 that it may have (e.g., due to buffering such downlink data in its buffer component) to the DU 120 via the first downlink data communication path. After the source CU-UP node 122 has transferred any remaining downlink data associated with the device 108 that it may have to the DU 120, as indicated at reference numeral 250 of the enhanced CU-UP change process 200, the source CU-UP node 122 can communicate the end marker to the DU 120, which can be received by the DU 120.

In response to receiving the end marker from the source CU-UP node 122, as indicated at reference numeral 252 of the enhanced CU-UP change process 200, the DU 120 can communicate a downlink data delivery status message (e.g., NR-UP downlink data delivery status message) to the target CU-UP node 124.

In response to the target CU-UP node 124 receiving the downlink data delivery status message from the DU 120, as indicated at reference numeral 254 of the enhanced CU-UP change process 200, the target CU-UP node can begin communicating downlink data associated with the device 108 to the DU 120 via the second downlink data communication path.

As indicated at reference numeral 256 of the enhanced CU-UP change process 200, the target CU-UP node 124 can transfer the buffered downlink data associated with the device 108 to the DU 120 via the second downlink data communication path. The DU 120 can receive the previously buffered downlink data from the target CU-UP node 124, and can communicate such downlink data to the device 108.

As indicated at reference numeral 258 of the enhanced CU-UP change process 200, the UPF node 114 can communicate subsequent downlink data associated with the device 108 to the target CU-UP node 124 via the second downlink data communication path.

As indicated at reference numeral 260 of the enhanced CU-UP change process 200, the target CU-UP node 124 can transfer such downlink data to the DU 120 via the second downlink data communication path. The DU 120 can receive the downlink data from the target CU-UP node 124, and can communicate such downlink data to the device 108.

As indicated at reference numeral 262 of the enhanced CU-UP change process 200, the CU-CP node 118 can communicate a bearer context release command message to the source CU-UP node 122 to facilitate releasing the bearer context associated with the device 108 that the source CU-UP node 122 has set up. In response to the bearer context release command message, the source CU-UP node 122 can release the bearer context associated with the device 108. As indicated at reference numeral 264 of the enhanced CU-UP change process 200, the source CU-UP node 122 can communicate a bearer context release complete message to the CU-CP node 118. The CU-CP node 118 can receive the bearer context release complete message, wherein such message can indicate that the source CU-UP node 122 has released the bearer context associated with the device 108.

At this point, the CU-UP change from the source CU-UP node 122 to the target CU-UP node 124 with respect to the device 108 can be complete.

Figure 4:
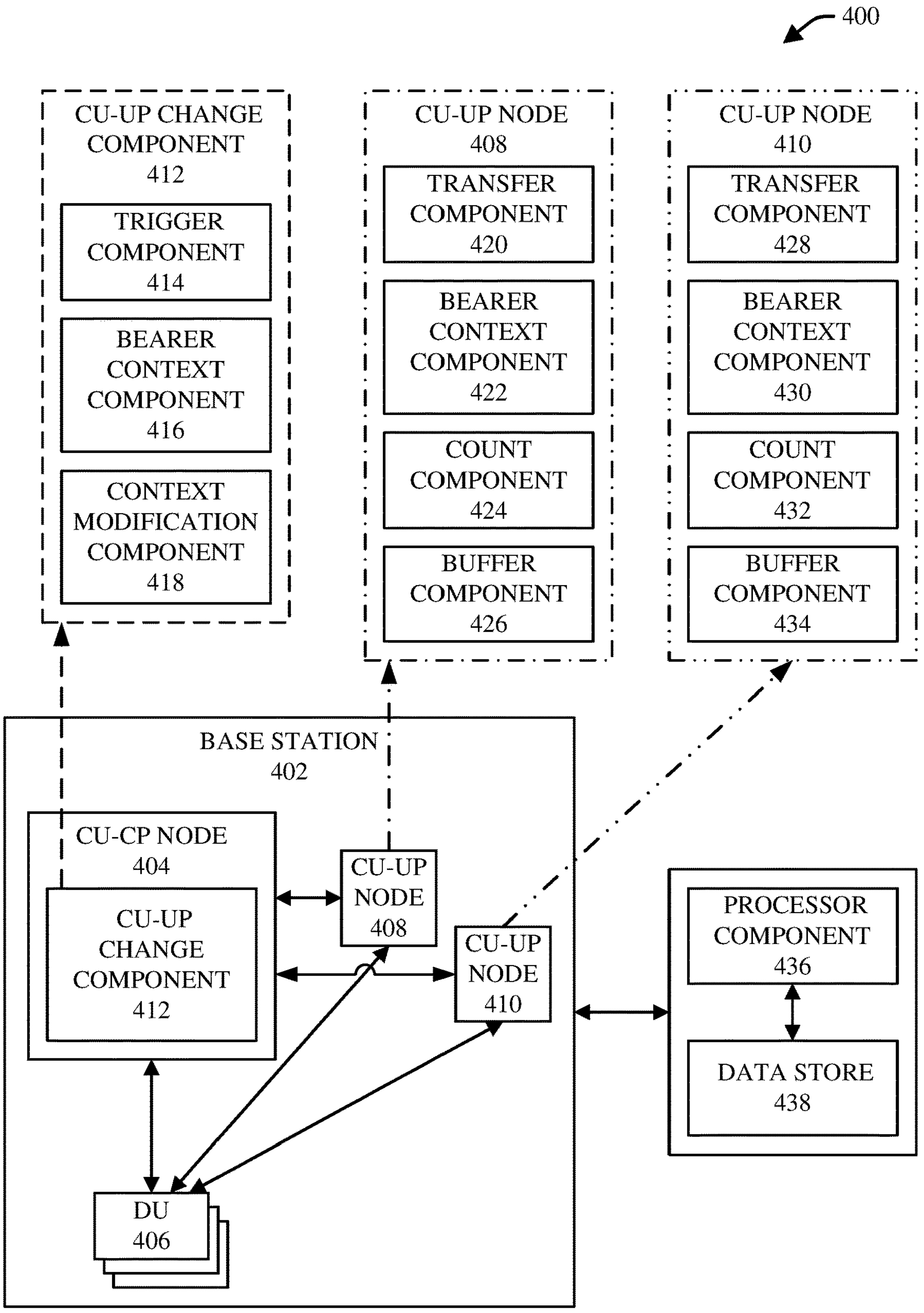
FIG. 4 depicts a block diagram of a non-limiting example system that can desirably perform a CU-UP change, in accordance with various aspects and embodiments of the disclosed subject matter.

Turning to FIG. 4, FIG. 4 depicts a block diagram of a non-limiting example system 400 that can desirably (e.g., efficiently, reliably, suitably, enhancedly, or optimally) perform a CU-UP change, in accordance with various aspects and embodiments of the disclosed subject matter. The system 400 can comprise a base station 402 (e.g., a gNB or other NR or xG NB), such as described herein. The base station 402 can comprise a CU-CP node 404 (e.g., a gNB or other NR-NB CU-CP node), one or more DUs (e.g., a gNB or other NR-NB DUs), including DU 406, a desired number of CU-UP nodes (e.g., a gNB or other NR-NB CU-UP nodes), including CU-UP node 408 and CU-UP node 410, and/or other network equipment. The CU-CP node 404 can be associated or interfaced with the DUs (e.g., DU 406) via an interface (e.g., F1-C interface) or connection. The CU-CP node 404 can be associated or interfaced with the CU-UP nodes (e.g., CU-UP nodes 408 and/or 410) via an interface (e.g., E1 interface) or connection. The CU-UP nodes (e.g., CU-UP nodes 408 and/or 410) can be associated or interfaced with the DUs (e.g., DU 406) via an interface (e.g., F1-U interface) or connection. The base station 402 can be associated with one or more devices, and can be associated with the core network, such as described herein.

The CU-CP node 404 can comprise a CU-UP change component 412 (e.g., enhanced CU-UP change component) that can comprise or be associated with a trigger component 414, a bearer context component 416, and a context modification component 418. The CU-UP change component 412 can perform various functions and operations, and can control or perform functions and operations of the enhanced CU-UP change process, such as described herein. The trigger component 414 can initiate or trigger a CU-UP change (e.g., from source CU-UP node 408 to target CU-UP node 410) and/or the enhanced CU-UP change process based at least in part on determining or detecting that the defined condition (e.g., a defined load or congestion condition, a defined overload condition, or another defined condition) associated with the source CU-UP node 408 exists or has occurred, such as described herein. The defined condition can indicate that moving or transitioning one or more device connections, including the device connection associated with the device, from the source CU-UP node 408 to the target CU-UP node 410 can be desirable (e.g., wanted, needed, or optimal). In some embodiments, the CU-CP node 404 (e.g., the trigger component 414 of the CU-CP node 404) can receive status indicator information from the source CU-UP node 408 (e.g., via the E1 interface), wherein the status indicator information can indicate or specify that the source CU-UP node 408 is under or subject to the defined condition.

The bearer context component 416 can generate various bearer context-related messages, and can communicate various bearer context-related messages to the CU-UP nodes (e.g., the source CU-UP node 408 and/or the target CU-UP node 410), such as described herein. The bearer context-related messages can include bearer context setup request messages, bearer context modification request messages, bearer context release command messages, and/or other bearer context-related messages, that can comprise respective bearer context-related information, such as described herein. The bearer context component 416 also can receive bearer context-related messages, such as bearer context setup response messages, bearer context modification response messages, bearer context release complete messages, and/or other bearer context-related response messages, which can comprise respective bearer context-related information, from the CU-UP nodes (e.g., the source CU-UP node 408 and/or the target CU-UP node 410), such as described herein.

The context modification component 418 can generate context modification-related messages, such as interface and UE context modification request messages, comprising context modification-related information, and can communicate such context modification-related messages to DUs, such as the DU 406, such as described herein. The context modification component 418 also can receive context modification-related messages, such as interface and UE context modification response messages, comprising context modification-related response information, from DUs, such as the DU 406, such as described herein.

The CU-UP component 408 can comprise a transfer component 420, a bearer context component 422, a count component 424, and a buffer component 426. Similarly, the CU-UP component 410 can comprise a transfer component 428, a bearer context component 430, a count component 432, and a buffer component 434.

The respective transfer components 420 and 428 each can perform uplink data transfers to or towards the core network (e.g., via the UPF node) and downlink data transfers to the DU (e.g., DU 406) for delivery to the associated devices, such as described herein. The respective bearer context components 422 and 430 each can receive, at various times, bearer context-related messages (e.g., bearer context-related messages can include bearer context setup request messages, bearer context modification request messages, bearer context release command messages, and/or other bearer context-related messages) from the CU-CP node 404, and, at various times, can generate, and can communicate to the CU-CP node 404, bearer context-related messages (e.g., bearer context setup response messages, bearer context modification response messages, bearer context release complete messages, and/or other bearer context-related response messages).

The respective count components 424 and 432 each can maintain respective uplink PDCP count values and respective downlink PDCP count values associated with respective devices and communication sessions. The respective count components 424 and 432 each also can provide (e.g., communicate or facilitate communicating) an uplink PDCP count value and/or a downlink PDCP count value associated with a device or communication session to the CU-CP node 404 (e.g., as part of a bearer context modification response message in response to a bearer context modification request message), such as described herein. The respective count components 424 and 432 each also can receive an uplink PDCP count value and/or a downlink PDCP count value associated with a device or communication session from the CU-CP node 404 (e.g., as part of a bearer context modification request message, during a CU-UP change process), such as described herein.

The respective buffer components 426 and 434 can buffer (e.g., temporarily store) uplink data and/or downlink data associated with devices and/or communication sessions, such as described herein. The respective buffer components 426 and 434 can comprise volatile or non-volatile memory to facilitate storing or buffering the uplink data and/or downlink data, such as described herein.

In accordance with various embodiments, the system 400 can comprise a processor component 436 and a data store 438 that can be associated with (e.g., communicatively connected to) the base station 402 (as depicted) or part of the base station 402 or respective components (e.g., CU-CP node 404, DU 406, CU-UP node 408, and/or CU-UP node 410) of the base station 402. In some embodiments, the processor component 436 can comprise respective processors that can be part of or associated with respective components (e.g., CU-CP node 404, DU 406, CU-UP node 408, and/or CU-UP node 410) of the base station 402. In certain embodiments, the data store 438 can comprise respective data stores that can be part of or associated with respective components (e.g., CU-CP node 404, DU 406, CU-UP node 408, and/or CU-UP node 410) of the base station 402.

The processor component 436 can work in conjunction with the other components (e.g., CU-CP node 404, DU 406, CU-UP node 408, CU-UP node 410, and/or other component) to facilitate performing the various functions and operations of the system 400. The processor component 436 can employ one or more processors (e.g., one or more central processing units (CPUs)), microprocessors, or controllers that can process information relating to data, files, applications, services, CU-UP changes, data communication path updates or switches, bearer context, interface and device (e.g., UE) context, uplink and downlink PDCP context and count values, data processing operations, messages, notifications, alarms, alerts, preferences (e.g., user or client preferences), hash values, metadata, parameters, traffic flows, policies, defined CU-UP change management criteria, algorithms (e.g., enhanced CU-UP change algorithms, hash algorithms, data compression algorithms, data decompression algorithms, and/or other algorithm), interfaces, protocols, tools, and/or other information, to facilitate operation of the system 400, and control data flow between the system 400 and/or other components (e.g., other network components, the core network, the communication network, a device, a node, a service, a user, or other entity) associated with the system 400.

The data store 438 can store data structures (e.g., user data, metadata), code structure(s) (e.g., modules, objects, hashes, classes, procedures) or instructions, information relating to data, files, applications, services, CU-UP changes, data communication path updates or switches, bearer context, interface and device (e.g., UE) context, uplink and downlink PDCP context and count values, data processing operations, messages, notifications, alarms, alerts, preferences (e.g., user or client preferences), hash values, metadata, parameters, traffic flows, policies, defined CU-UP change management criteria, algorithms (e.g., enhanced CU-UP change algorithms, hash algorithms, data compression algorithms, data decompression algorithms, and/or other algorithm), interfaces, protocols, tools, and/or other information, to facilitate controlling or performing operations associated with the system 400. The data store 438 can comprise volatile and/or non-volatile memory, such as described herein. In an aspect, the processor component 436 can be functionally coupled (e.g., through a memory bus) to the data store 438 in order to store and retrieve information desired to operate and/or confer functionality, at least in part, to the base station 402, CU-CP node 404, DU 406, CU-UP node 408, CU-UP node 410, data store 438, and/or other component of the system 400, and/or substantially any other operational aspects of the system 400.

As disclosed, the data store 438 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

It is to be appreciated and understood that the system 400 can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 5-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 5:
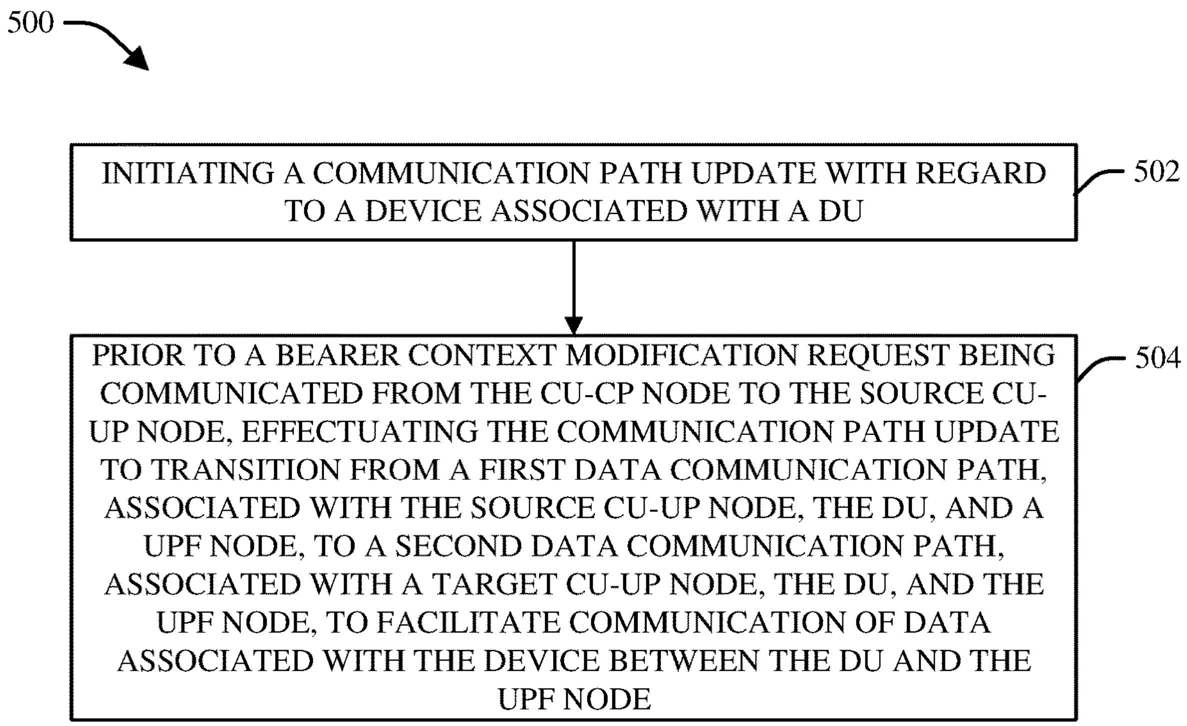
FIG. 5 illustrates a flow chart of an example method that can desirably perform a CU-UP change, in accordance with various aspects and embodiments of the disclosed subject matter.

FIG. 5 illustrates a flow chart of an example method 500 that can desirably (e.g., efficiently, suitably, enhancedly, or optimally) perform a CU-UP change, in accordance with various aspects and embodiments of the disclosed subject matter. The method 500 can be employed by, for example, a system comprising the base station, employing the CU-CP node (e.g., comprising the CU-UP change component), DU, source and target CU-UP nodes, processor component, data store, and/or other components.

At 502, a communication path update can be initiated with regard to a device associated with a DU. The CU-CP node can initiate the communication path update with regard to the device associated with the DU, to facilitate transitioning the device communication connection from a source CU-UP node to a target CU-UP node. For example, in response to detecting a defined condition (e.g., a defined load or congestion condition, a defined overload condition, or another defined condition) associated with the source CU-UP node, the CU-CP node can initiate the communication path update with regard to the device and DU to facilitate transitioning the device communication connection from the source CU-UP node to the target CU-UP node.

At 504, prior to a bearer context modification request being communicated from the CU-CP node to the source CU-UP node, the communication path update to transition from a first data communication path, associated with the source CU-UP node, the DU, and a UPF node, to a second data communication path, associated with a target CU-UP node, the DU, and the UPF node, can be effectuated, to facilitate communication of data associated with the device between the DU and the UPF node. For instance, prior to the CU-CP node communicating the bearer context modification request to the source CU-UP node, the CU-CP node, in conjunction with other nodes (e.g., of the base station), can effectuate, perform, and/or manage, and/or can facilitate effectuating, performing, and/or managing the communication path update to transition from the first data communication path (e.g., first uplink data communication path), associated with the source CU-UP node, the DU, and the UPF node, to the second data communication path (e.g., second uplink data communication path), associated with the target CU-UP node, the DU, and the UPF node, to facilitate communication of data (e.g., uplink data packets) associated with the device between the DU and the UPF node, such as described herein.

In some embodiments, the CU-CP node, in conjunction with other nodes, also can effectuate, perform, and/or manage, and/or can facilitate effectuating, performing, and/or managing the communication path update to transition from a first downlink data communication path, associated with the source CU-UP node, the DU, and the UPF node, to a second downlink data communication path, associated with the target CU-UP node, the DU, and the UPF node, to facilitate communication of downlink data packets associated with the device between the DU and the UPF node, such as described herein.

Figure 6:
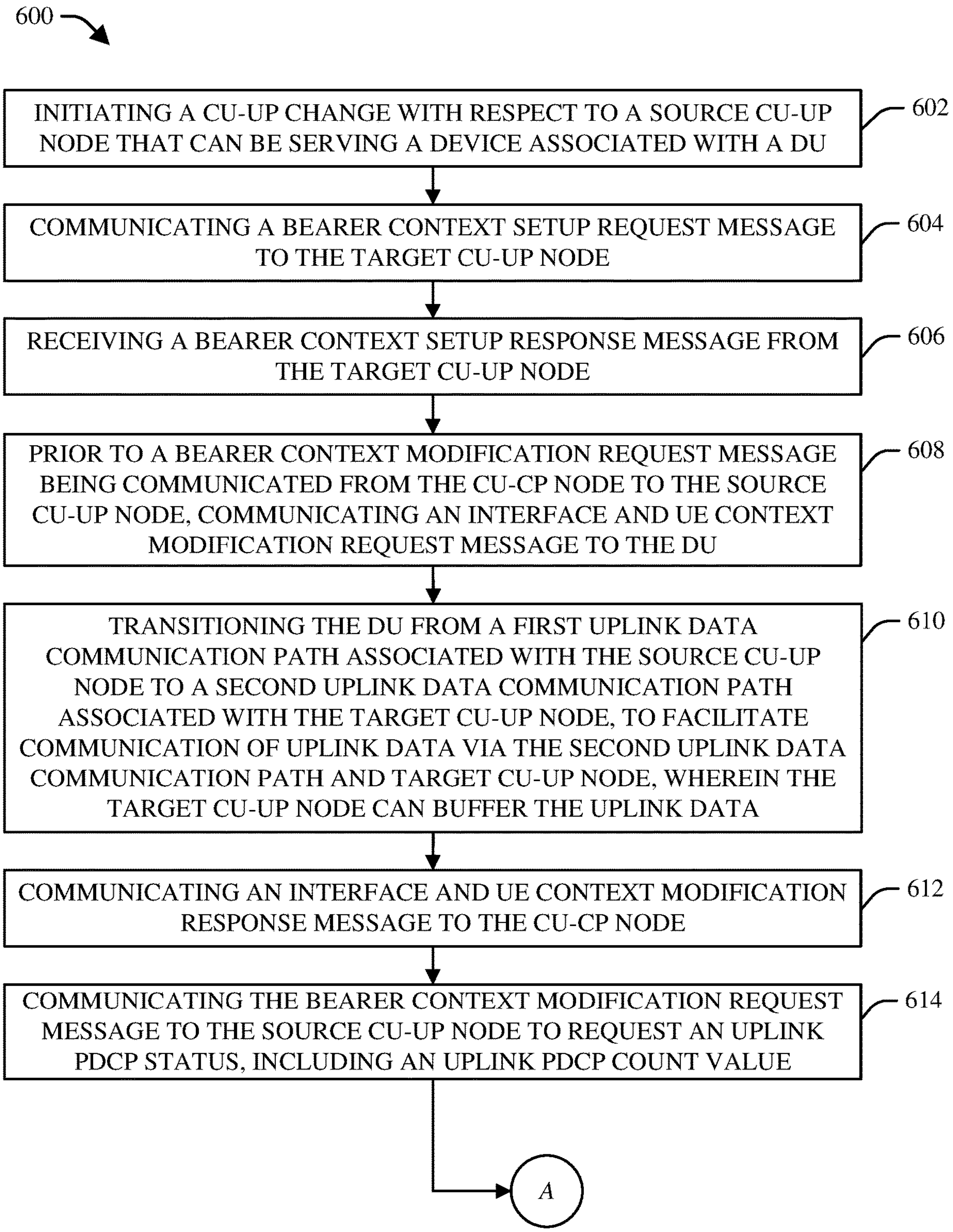
FIGS. 6 and 7 depict a flow chart of an example method that can desirably perform an uplink portion of a CU-UP change, in accordance with various aspects and embodiments of the disclosed subject matter.
Figure 7:
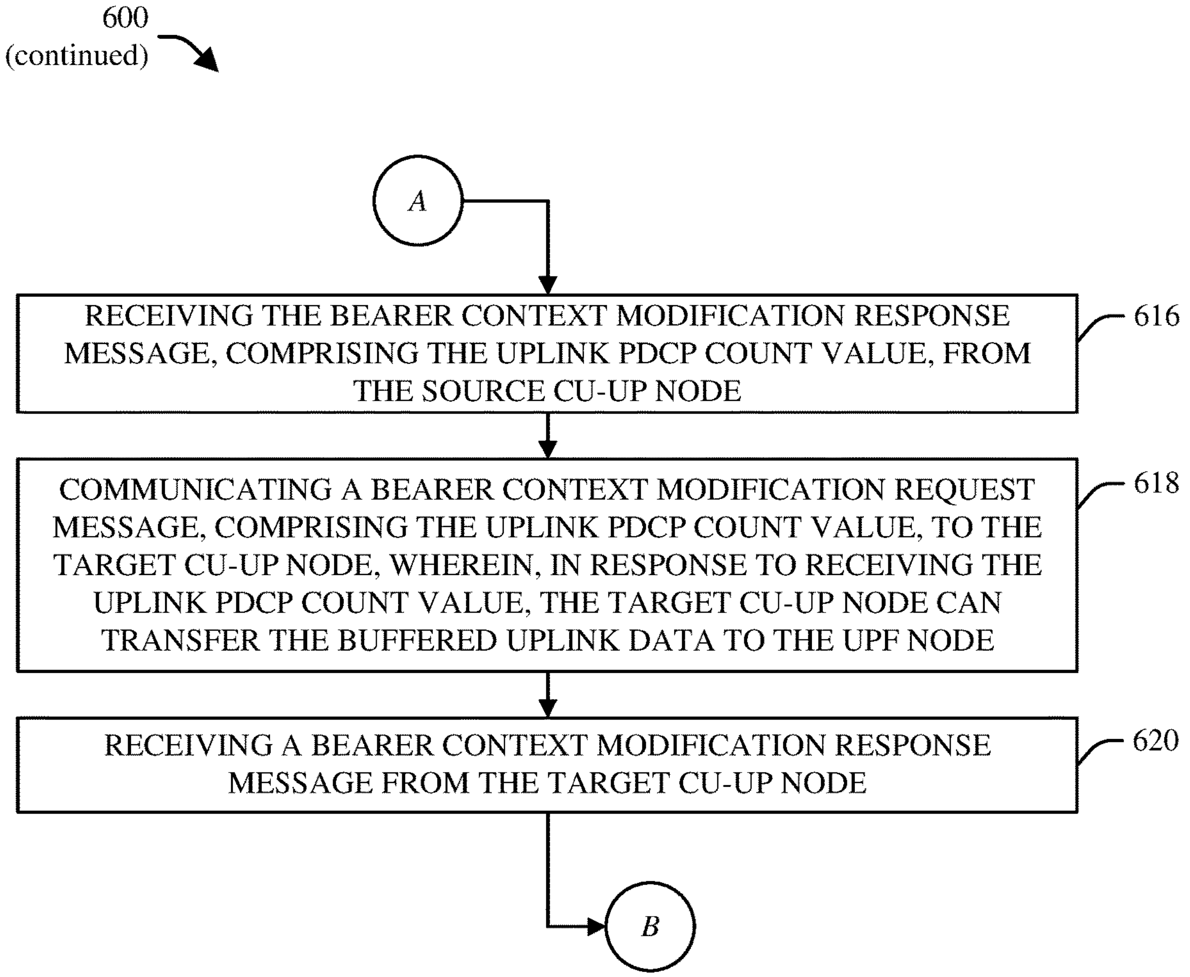

FIGS. 6 and 7 depict a flow chart of an example method 600 that can desirably (e.g., efficiently, suitably, enhancedly, or optimally) perform an uplink portion of a CU-UP change, in accordance with various aspects and embodiments of the disclosed subject matter. The method 600 can be employed by, for example, a system comprising the base station, employing the CU-CP node (e.g., comprising the CU-UP change component), DU, source and target CU-UP nodes, processor component, data store, and/or other components.

At 602, a CU-UP change can be initiated with respect to a source CU-UP node that can be serving a device associated with a DU. The CU-CP node can initiate or trigger the CU-UP change to change the source CU-UP node to a target CU-UP node with respect to the device (e.g., UE) associated with the DU, which can be associated with the source CU-UP node. In some embodiments, the CU-CP node can initiate or trigger such CU-UP change in response to determining or detecting a defined condition (e.g., a defined load or congestion condition, a defined overload condition, or another defined condition) associated with the source CU-UP node, where the CU-UP change can be desired (e.g., wanted, needed, or otherwise desired) in response to, and/or to mitigate, the defined condition. In certain embodiments, the CU-CP node can receive a status indicator (e.g., status indication information) from the source CU-UP node, wherein the status indicator can indicate that the defined condition associated with the source CU-UP node has occurred or exists.

At 604, a bearer context setup request message can be communicated to the target CU-UP node. The CU-CP node can communicate the bearer context setup request message to the target CU-UP node, such as described herein. The bearer context setup request message can request that the target CU-UP node set up a bearer context, and can comprise uplink TNL address information for NG-U interface (or S1-U interface), uplink NG-U TEID, and/or other desired information.

At 606, a bearer context setup response message can be received from the target CU-UP node. The CU-CP node can receive the bearer context setup response message from the target CU-UP node, such as described herein. The bearer context setup response message can comprise the uplink TNL address information for F1-U, uplink F1-U TEID, downlink TNL address information for NG-U interface (or S1-U interface), downlink NG-U TEID, and/or other desired information associated with the target CU-UP node.

At 608, prior to a bearer context modification request message being communicated from the CU-CP node to the source CU-UP node, an interface and UE context modification request message can be communicated to the DU. For instance, prior to the bearer context modification request message being communicated from the CU-CP node to the source CU-UP node, the CU-CP node can communicate the interface and UE context modification request message to the DU to request that the DU modify one or more bearers with respect to the device and the interface (e.g., F1 interface), to facilitate transitioning from the source CU-UP node to the target CU-UP node with respect to the DU and associated device, such as described herein. The interface and UE context modification request message can comprise information, such as the uplink F1-U TEID associated with the target CU-UP node.

At 610, the DU can transition from a first uplink data communication path associated with the source CU-UP node to a second uplink data communication path associated with the target CU-UP node, to facilitate communication of uplink data via the second uplink data communication path and target CU-UP node, wherein the target CU-UP node can buffer the uplink data. For example, in response to the DU receiving the interface and UE context modification request message from the CU-CP node, and based at least in part on the information (e.g., the uplink F1-U TEID) contained therein, the DU can be reconfigured, and can transition (e.g., switch) from the first uplink data communication path associated with the source CU-UP node to the second uplink data communication path associated with the target CU-UP node to facilitate communication of uplink data via the second uplink data communication path and the target CU-UP node, such as described herein. The target CU-UP node can receive the uplink data associated with the device from the DU and can buffer the uplink data (e.g., in a buffer component), for example, at least until the target CU-UP node receives the uplink PDCP count value from the CU-CP node, such as described herein. In some embodiments, this transition to the second uplink data communication path associated with the target CU-UP node and the buffering of the uplink data by the target CU-UP node can occur prior to the bearer context modification request message being communicated from the CU-CP node to the source CU-UP node.

At 612, an interface and UE context modification response message can be communicated to the CU-CP node. For instance, the DU can communicate the interface and UE context modification response message to the CU-CP node, wherein such response message can comprise desired information, such as, for example, the downlink F1-U TEID. In some embodiments, the DU can communicate such response message to the CU-CP node prior to the bearer context modification request message being communicated from the CU-CP node to the source CU-UP node.

At 614, the bearer context modification request message can be communicated to the source CU-UP node. The CU-CP node can communicate the bearer context modification request message can be communicated to the source CU-UP node, wherein the bearer context modification request message can request an uplink PDCP status, including the uplink PDCP count value, from the source CU-UP node, such as described herein. At this point, the method 600 can proceed to reference point A, wherein the method 600 can continue from reference point A, as shown in FIG. 7 and described herein.

At 616, the bearer context modification response message, comprising the uplink PDCP count value, can be received from the source CU-UP node. The CU-CP node can receive the bearer context modification response message, comprising the uplink PDCP status, which can include the uplink PDCP count value, from the source CU-UP node, such as described herein.

At 618, a bearer context modification request message, comprising the uplink PDCP count value, can be communicated to the target CU-UP node, wherein, in response to receiving the uplink PDCP count value, the target CU-UP node can transfer the buffered uplink data to the UPF node. The CU-CP node can communicate the bearer context modification request message, comprising the uplink PDCP count value, to the target CU-UP node, such as described herein. In response to receiving the uplink PDCP count value from the CU-CP node, the target CU-UP node can transfer the uplink data it had buffered, as well as any new uplink data it receives, to the UPF node, such as described herein.

At 620, a bearer context modification response message can be received from the target CU-UP node. The CU-UP node can receive the bearer context modification response message from the target CU-UP node. At this point, the method 600 can proceed to reference point B, wherein, in some embodiments, method 800 of FIG. 8 can continue from reference point B, as shown in FIG. 8 and described herein.

Figure 8:
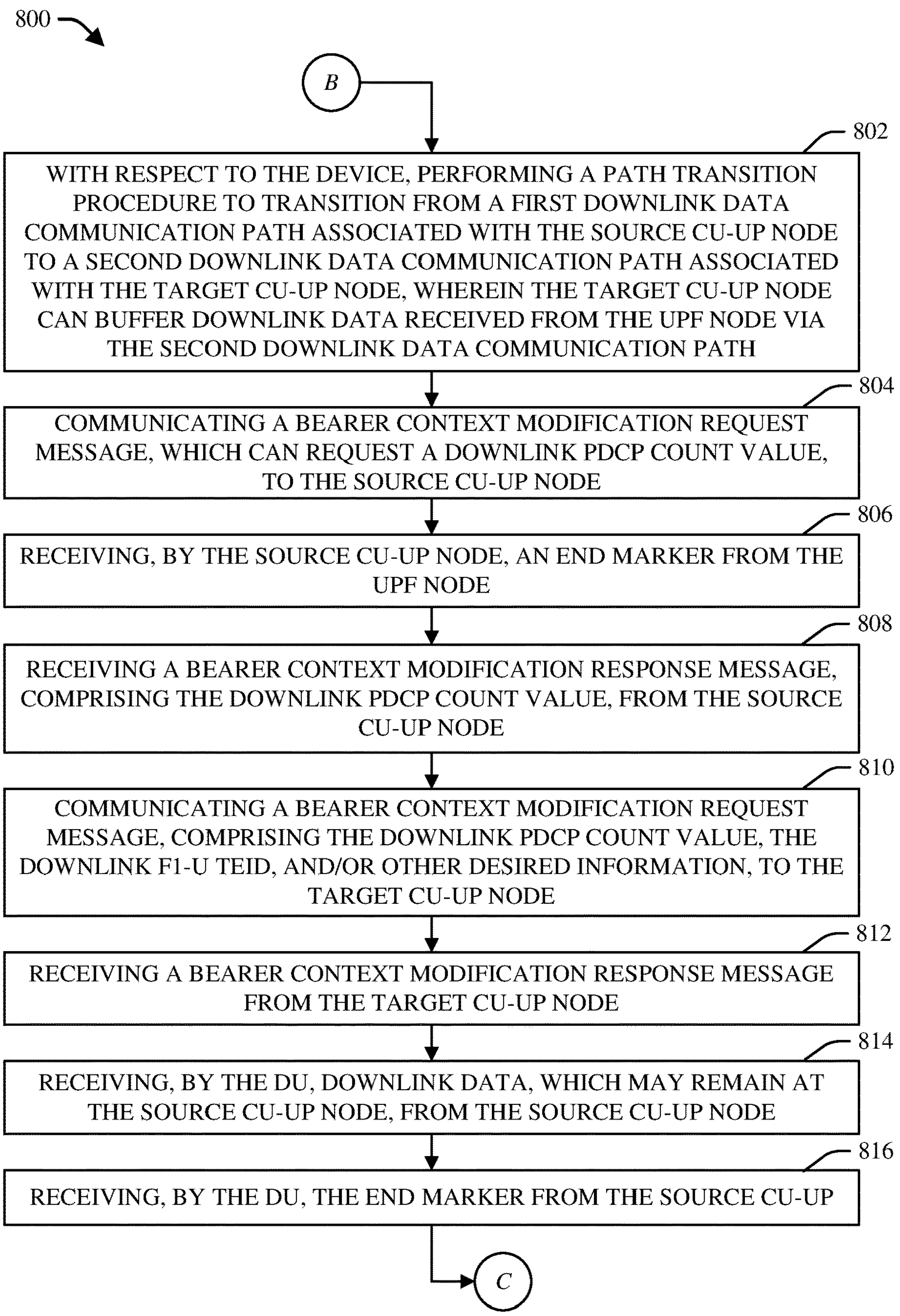
FIGS. 8 and 9 illustrate a flow chart of an example method that can desirably perform a downlink portion of a CU-UP change, in accordance with various aspects and embodiments of the disclosed subject matter.
Figure 9:
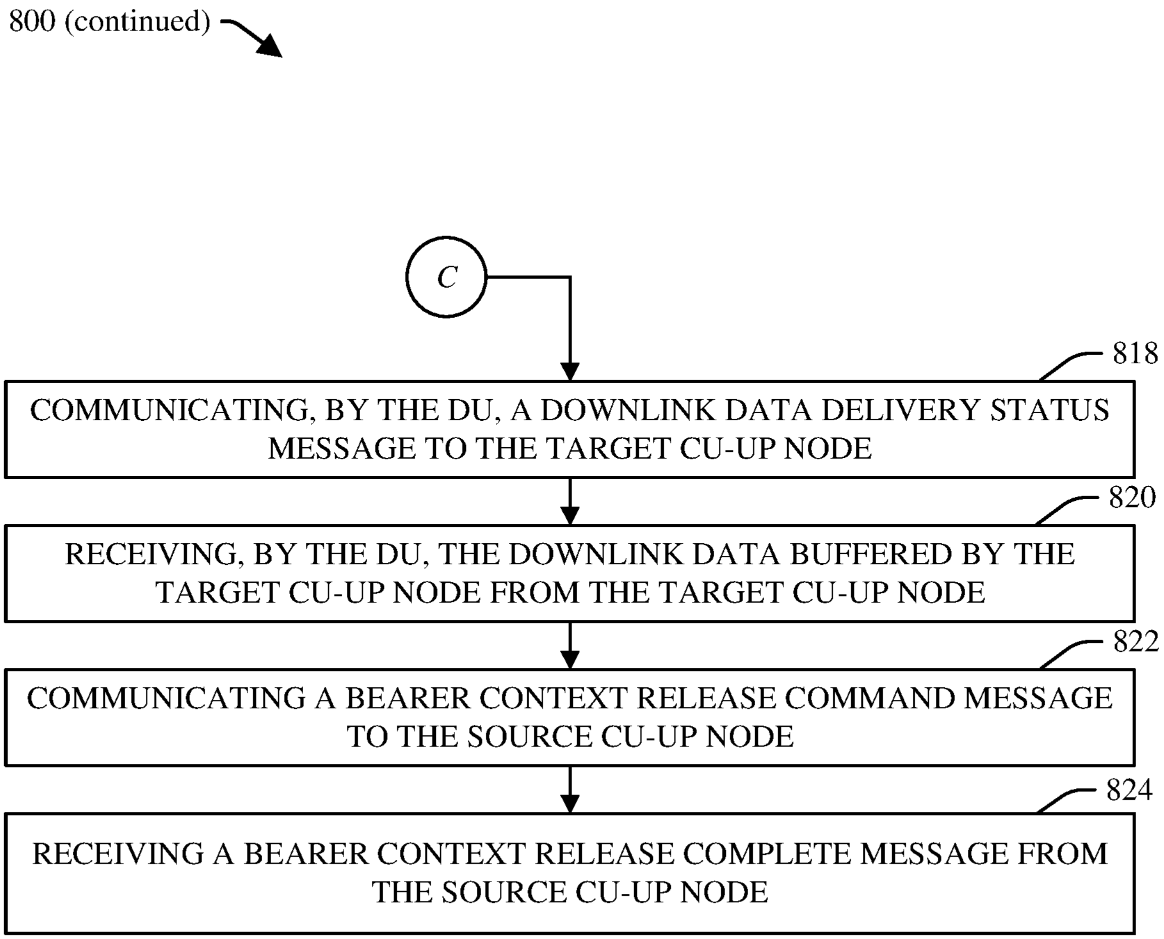

FIGS. 8 and 9 illustrate a flow chart of an example method 800 that can desirably (e.g., efficiently, suitably, enhancedly, or optimally) perform a downlink portion of a CU-UP change, in accordance with various aspects and embodiments of the disclosed subject matter. The method 800 can be employed by, for example, a system comprising the base station, employing the CU-CP node (e.g., comprising the CU-UP change component), DU, source and target CU-UP nodes, processor component, data store, and/or other components. In some embodiments, the method 800 can proceed from reference point B, wherein reference point B can stem from the method 600 of FIGS. 6 and 7, as described herein.

At 802, with respect to the device, a path transition procedure can be performed to transition from a first downlink data communication path associated with the source CU-UP node to a second downlink data communication path associated with the target CU-UP node, wherein the target CU-UP node can buffer downlink data received from the UPF node via the second downlink data communication path. For instance, with respect to downlink communications associated with the device, the CU-CP node, UPF node, and/or other components of the base station can perform the path transition procedure to transition (e.g., switch) from the first downlink data communication path associated with the source CU-UP node to the second downlink data communication path associated with the target CU-UP node, based at least in part on the downlink NG-U TEID. Subsequent to the transition to the second downlink data communication path, the target CU-UP node can begin to receive the downlink data associated with the device from the UPF node, and the target CU-UP node can buffer such downlink data (e.g., in the buffer component), for example, until the target CU-UP node receives the downlink data delivery status message (e.g., NR-UP downlink data delivery status message) from the DU, such as described herein.

At 804, a bearer context modification request message, which can request a downlink PDCP count value, can be communicated to the source CU-UP node. The CU-CP node can communicate the bearer context modification request message, which can request a downlink PDCP count value, to the source CU-UP node, such as described herein.

At 806, the source CU-UP node can receive an end marker from the UPF node. The UPF node can communicate the end marker to the source CU-UP node, in connection with the transitioning of the communication of downlink data from the first downlink data communication path associated with the source CU-UP node to the second downlink data communication path associated with the target CU-UP node. The source CU-UP node typically can wait to receive the end marker from the UPF node before the source CU-UP node responds to the bearer context modification request message indicated at reference numeral 804.

At 808, a bearer context modification response message, comprising the downlink PDCP count value, can be received from the source CU-UP node. The CU-CP node can receive the bearer context modification response message, comprising the downlink PDCP count value, from the source CU-UP node.

At 810, a bearer context modification request message, comprising the downlink PDCP count value, the downlink F1-U TEID, and/or other desired information, can be communicated to the target CU-UP node. The CU-CP node can communicate the bearer context modification request message, comprising the downlink PDCP count value, the downlink F1-U TEID, and/or other desired information, to the target CU-UP node, such as described herein. This information can facilitate (e.g., enable) the target CU-UP node to desirably communicate the buffered downlink data associated with the device it has and any new downlink data associated with the device it receives to the DU.

At 812, a bearer context modification response message can be received from the target CU-UP node. The CU-CP node can receive the bearer context modification response message from the target CU-UP node.

At 814, downlink data, which may remain at the source CU-UP node, can be received, by the DU, from the source CU-UP node. The source CU-UP node may still have some remaining downlink data associated with the device that the source CU-UP node had received from the UPF node before the UPF node switched over to sending downlink data to the target CU-UP node via the second downlink data communication path. The DU desirably can continue to receive, from the source CU-UP node, any remaining downlink data the source CU-UP node may have (e.g., due to buffering of downlink data at the source CU-UP node), such as described herein. The DU can communicate such downlink data to the device.

At 816, the end marker can be received, by the DU, from the source CU-UP. The DU can receive the end marker from the source CU-UP node, after the source CU-UP node has communicated any remaining downlink data it has to the DU. At this point, the method 800 can proceed to reference point C, wherein the method 800 can continue from reference point C, as shown in FIG. 9 and described herein.

At 818, a downlink data delivery status message can be communicated, by the DU, to the target CU-UP node. For instance, in response to receiving the end marker from the source CU-UP node, the DU can communicate the downlink data delivery status message (e.g., NR-UP downlink data delivery status message) to the target CU-UP node.

At 820, the downlink data buffered by the target CU-UP node can be received, by the DU, from the target CU-UP node. In response to the target CU-UP node receiving the downlink data delivery status message from the DU, the target CU-UP node can begin communicating the buffered downlink data and any subsequent downlink data associated with the device to the DU. The DU can receive the buffered downlink data and subsequent downlink data, and can communicate such downlink data to the device.

At 822, a bearer context release command message can be communicated to the source CU-UP node. The CU-CP node can communicate the bearer context release command message to the source CU-UP node to facilitate releasing the bearer context associated with the device that the source CU-UP node has set up. In response to such message, the source CU-UP node can release the bearer context.

At 824, a bearer context release complete message can be received from the source CU-UP node. The CU-CP node can receive bearer context release complete message from the source CU-UP node, wherein such message can indicate that the source CU-UP node has released the bearer context associated with the device.

Figure 10:
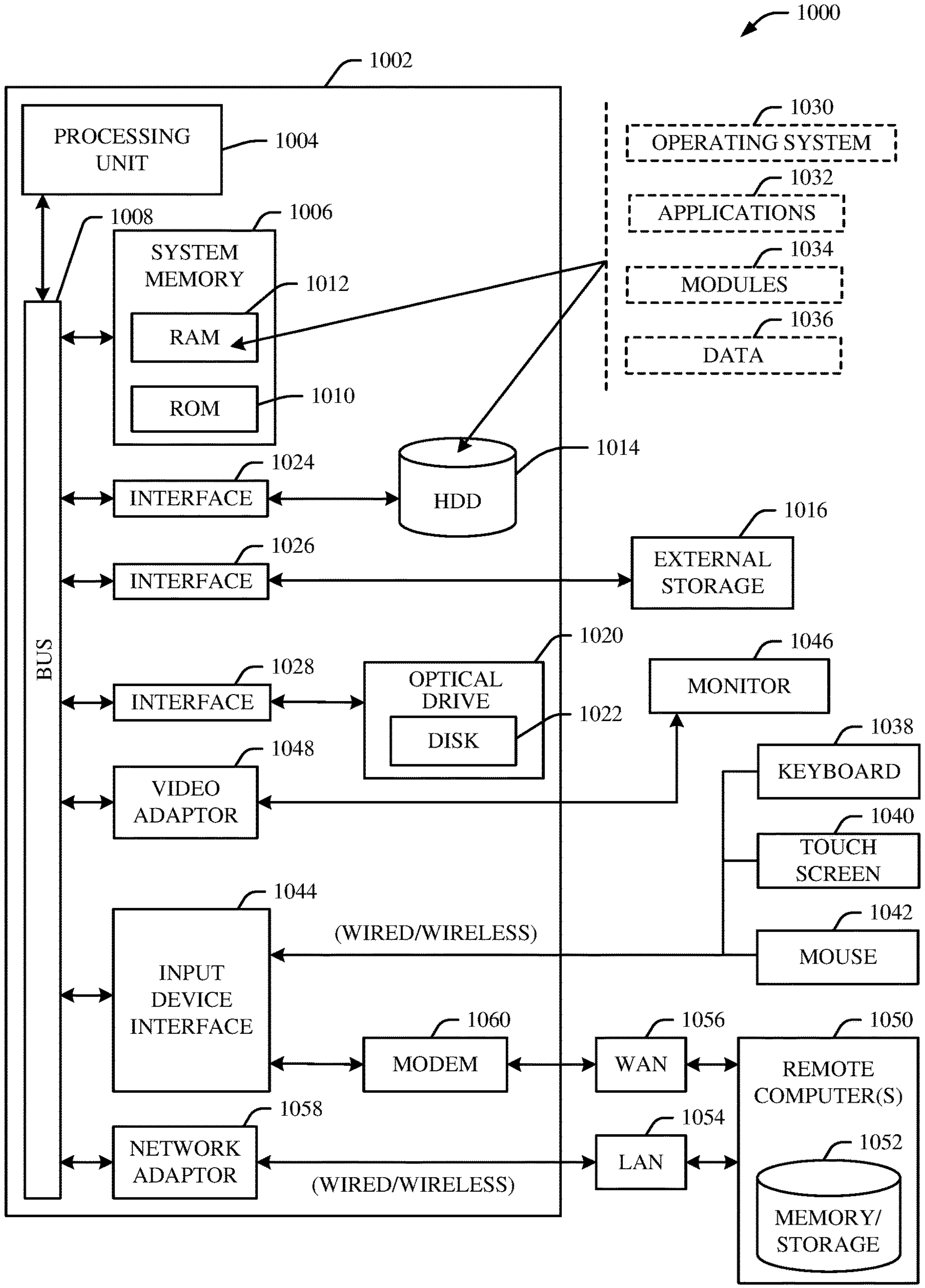
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component." "system," "platform," "framework," "layer." "interface." "agent." and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, user equipment (UE), communication network, core network, service, application, central unit (CU)-user plane (UP) (CU-UP) node, central unit (CU)-control plane (CP) (CU-CP) node, user plane function (UPF) node, access and mobility management function (AMF) node, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

initiating, by a system comprising at least one processor, a communication path update with regard to a device associated with a distributed unit;

prior to a bearer context modification request being communicated from a central unit-control plane node to a source central unit-user plane node, effectuating, by the system, the communication path update to transition from a first data communication path, associated with the source central unit-user plane node, the distributed unit, and a user plane function node, to a second data communication path, associated with a target central unit-user plane node, the distributed unit, and the user plane function node, to facilitate communication of data associated with the device between the distributed unit and the user plane function node, wherein the data comprises uplink data packets, and wherein the bearer context modification request is associated with an uplink connection associated with the device;

in response to the bearer context modification request being communicated to the source central unit-user plane node, receiving, by the system, an uplink packet-data-convergence-protocol count value from the source central unit-user plane node; and communicating, by the system, the uplink packet-data-convergence-protocol count value to the target central unit-user plane node, wherein subsequent to the target central unit-user plane node receiving the uplink packet-data-convergence-protocol count value, the uplink data packets, which were received from the distributed unit via the second data communication path and buffered at the target central unit-user plane node, are enabled to be communicated from the target central unit-user plane node to the user plane function node.

2. The method of claim 1, wherein, subsequent to the transitioning from the first data communication path associated with the source central unit-user plane node to the second data communication path associated with the target central unit-user plane node, and prior to the target central unit-user plane node receiving the uplink packet-data-convergence-protocol count value from the central unit-control plane node, the uplink data packets received, via the second data communication path, by the target central unit-user plane node from the distributed unit are buffered at the target central unit-user plane node.

3. The method of claim 1, further comprising:

receiving, by the system, status indicator information from the source central unit-user plane node, wherein the status indicator information indicates that the source central unit-user plane node is under or subject to a defined condition that indicates transitioning from the uplink connection associated with the device and the source central unit-user plane node is to be performed.

4. The method of claim 1, wherein the effectuating of the communication path update to transition from a first data communication path, associated with the source central unit-user plane node, the distributed unit, and a user plane function node, to a second data communication path, associated with a target central unit-user plane node, the distributed unit, and the user plane function node is performed concurrently with effectuating a downlink communication path update, with regard to the device, to transition from a first downlink communication path, associated with the source central unit-user plane node, the distributed unit, and the user plane function node, to a second downlink data communication path, associated with the target central unit-user plane node, the distributed unit, and the user plane function node.

5. The method of claim 1, wherein the initiating of the communication path update comprises: in response to determining that the source central unit-user plane node is operating under a defined load condition, communicating a bearer context setup request to the target central unit-user plane node, to facilitate the initiating of the communication path update and the transition from the first data communication path associated with the source central unit-user plane node to the second data communication path associated with the target central unit-user plane node.

6. The method of claim 1, wherein the effectuating further comprises:

prior to the bearer context modification request being communicated from the central unit-control plane node to the source central unit-user plane node, and in response to an interface and device context modification request relating to the device that is received from the central unit-control plane node, configuring, by the system, the distributed unit to communicate the uplink data packets to the target central unit-user plane node.

7. The method of claim 1, wherein the effectuating of the communication path update to transition from the first data communication path associated with the source central unit-user plane node to the second data communication path associated with the target central unit-user plane node, prior to the bearer context modification request being communicated from the central unit-control plane node to the source central unit-user plane node, mitigates or eliminates loss of one or more data packets, comprising one or more of the uplink data packets, in connection with the transition from the first data communication path to the second data communication path.

8. The method of claim 1, wherein the first data communication path is a first uplink data communication path, wherein the second data communication path is a second uplink data communication path, and wherein the method further comprises:

with regard to the device, initiating, by the system, transitioning from a first downlink data communication path, associated with the source central unit-user plane node, the distributed unit, and the user plane function node, to a second downlink data communication path, associated with the target central unit-user plane node, the distributed unit, and the user plane function node, to facilitate communication of downlink data associated with the device between the user plane function node and the distributed unit.

9. The method of claim 8, wherein the bearer context modification request is a first bearer context modification request associated with an uplink connection associated with the device, and wherein the method further comprises:

communicating, by the system, a second bearer context modification request, associated with a downlink connection associated with the device, to the source central unit-user plane node.

10. The method of claim 9, wherein the source central unit-user plane node receives downlink data packets from the user plane function node until the transition from the first downlink data communication path associated with the source central unit-user plane node to the second downlink data communication path associated with the target central unit-user plane node is performed, wherein an end marker is received by the source central unit-user plane node from the user plane function node, wherein the downlink data packets received by the source central unit-user plane node are forwarded by the source central unit-user plane node to the distributed unit, and wherein the end marker is received by the distributed unit from the source central unit-user plane node after the downlink data packets are forwarded by the source central unit-user plane node to the distributed unit.

11. The method of claim 9, further comprising:

subsequent to the source central unit-user plane node receiving an end marker from the user plane function node, and in response to the second bearer context modification request, receiving, by the system, a bearer context modification response message, comprising a downlink packet-data-convergence-protocol count value, from the source central unit-user plane node; and communicating, by the system, a third bearer context modification request, comprising the downlink packet-data-convergence-protocol count value, to the target central unit-user plane node.

12. The method of claim 11, wherein the downlink data comprises downlink data packets, and wherein, subsequent to the transition from the first downlink data communication path associated with the source central unit-user plane node to the second downlink data communication path associated with the target central unit-user plane node being performed, and prior to the target central unit-user plane node receiving the downlink packet-data-convergence-protocol count value from the central unit-control plane node and a downlink data delivery status message from the distributed unit, the downlink data packets received, via the second data communication path, by the target central unit-user plane node from the user plane function node are buffered at the target central unit-user plane node.

13. The method of claim 12, wherein, in response to receiving the downlink packet-data-convergence-protocol count value from the central unit-control plane node, and in response to receiving the downlink data delivery status message from the distributed unit, the downlink data packets buffered at the target central unit-user plane node are able to be communicated from the target central unit-user plane node to the distributed unit.

14. A system, comprising:

at least one memory that stores computer executable components; and at least one processor that executes computer executable components stored in the at least one memory, wherein the computer executable components comprise:

a distributed unit associated with a user equipment; and a central unit-control plane that, before a bearer context modification request is communicated from the central unit-control plane to a source central unit-user plane, initiates performance of a communication path update to switch from a first data communication path, associated with the source central unit-user plane, the distributed unit, and a user plane function, to a second data communication path, associated with a target central unit-user plane, the distributed unit, and the user plane function, to facilitate communication of data associated with the user equipment between the distributed unit and the user plane function, wherein the data comprises uplink data packets, wherein the central unit-control plane communicates the bearer context modification request to the source central unit-user plane, receives a bearer context modification response message, comprising an uplink packet-data-convergence-protocol count value, from the source central unit-user plane, and communicates the uplink packet-data-convergence-protocol count value to the target central unit-user plane, and wherein, in response to the target central unit-user plane receiving the uplink packet-data-convergence-protocol count value, the target central unit-user plane communicates the uplink data packets, which had been received, via the second data communication path, from the distributed unit and buffered at the target central unit-user plane, to the user plane function.

15. The system of claim 14, wherein the central unit-control plane communicates a user equipment context modification request to the distributed unit, wherein, in response to the user equipment context modification request, the distributed unit is configured to communicate the uplink data packets to the target central unit-user plane to facilitate the transition from the first data communication path associated with the source central unit-user plane to the second data communication path associated with the target central unit-user plane, and wherein, subsequent to the transition from the first data communication path to the second data communication path, and before the target central unit-user plane receives the uplink packet-data-convergence-protocol count value from the central unit-control plane, the target central unit-user plane buffers the uplink data packets received, via the second data communication path, from the distributed unit.

16. The system of claim 15, wherein the central unit-control plane receives status indicator information from the source central unit-user plane, and wherein the status indicator information indicates that the source central unit-user plane is under or subject to a defined condition that indicates switching from an uplink connection associated with the user equipment and the source central unit-user plane is to be performed.

17. The system of claim 14, wherein the first data communication path is a first uplink data communication path, wherein the second data communication path is a second uplink data communication path, and wherein, as part of the performance of the communication path update, the central unit-control plane facilitates switching from a first downlink data communication path, associated with the source central unit-user plane, the distributed unit, and the user plane function, to a second downlink data communication path, associated with the target central unit-user plane, the distributed unit, and the user plane function, to facilitate communication of downlink data associated with the user equipment between the user plane function and the distributed unit.

18. The system of claim 17, wherein, the downlink data comprises first downlink data packets and second downlink data packets, wherein the source central unit-user plane receives the first downlink data packets from the user plane function until the switch from the first downlink data communication path to the second downlink data communication path is performed, and forwards the first downlink data packets to the distributed unit, wherein, subsequent to the switching from the first downlink data communication path to the second downlink data communication path being performed, and prior to the target central unit-user plane receiving a downlink packet-data-convergence-protocol count value from the central unit-control plane and a downlink data delivery status message from the distributed unit, the target central unit-user plane buffers the second downlink data packets received, via the second data communication path, from the user plane function, and wherein, in response to receiving the downlink packet-data-convergence-protocol count value and the downlink data delivery status message, the target central unit-user plane communicates the second downlink data packets, which had been buffered, to the distributed unit.

19. A non-transitory machine-readable medium, comprising executable instructions that, when executed by at least one processor, facilitate performance of operations, comprising:

in response to detecting a defined condition associated with a source central unit-user plane node associated with a distributed unit and a user equipment, triggering a communication path update relating to a first data communication path associated with the source central unit-user plane node;

prior to a bearer context modification request being communicated from a central unit-control plane node to the source central unit-user plane node, performing the communication path update to switch from the first data communication path, associated with the source central unit-user plane node, the distributed unit, and a user plane function node, to a second data communication path, associated with a target central unit-user plane node, the distributed unit, and the user plane function node, to facilitate communication of data associated with the user equipment between the distributed unit and the user plane function node, wherein the data comprises uplink data packets;

in response to the bearer context modification request being communicated to the source central unit-user plane node, receiving an uplink packet-data-convergence-protocol count value from the source central unit-user plane node; and communicating the uplink packet-data-convergence-protocol count value to the target central unit-user plane node, wherein subsequent to the target central unit-user plane node receiving the uplink packet-data-convergence-protocol count value, the uplink data packets, which were received from the distributed unit via the second data communication path and buffered at the target central unit-user plane node, are able to be communicated from the target central unit-user plane node to the user plane function node.

20. The non-transitory machine-readable medium of claim 19, wherein the data comprises the uplink data packets and downlink data packets associated with the user equipment, wherein the first data communication path is a first uplink data communication path, wherein the second data communication path is a second uplink data communication path, and wherein the operations further comprise:

with regard to the user equipment, switching from a first downlink data communication path, associated with the source central unit-user plane node, the distributed unit, and the user plane function node, to a second downlink data communication path, associated with the target central unit-user plane node, the distributed unit, and the user plane function node, to facilitate communication of the downlink data packets between the user plane function node and the distributed unit.

* * * * *